(12) United States Patent
Brewer et al.

(10) Patent No.: US 10,074,104 B2
(45) Date of Patent: Sep. 11, 2018

(54) CONTENT DYNAMICALLY TARGETTED ACCORDING TO CONTEXT

(71) Applicants: John Brewer, Malvern, PA (US); Cameron Altenhof-Long, Vancouver, WA (US)

(72) Inventors: John Brewer, Malvern, PA (US); Cameron Altenhof-Long, Vancouver, WA (US)

(73) Assignee: RICOH COMPANY, LTD., Tokyo (JP)

( * ) Notice: Subject to any disclaimer, the term of this patent is extended or adjusted under 35 U.S.C. 154(b) by 1157 days.

(21) Appl. No.: 14/199,903

(22) Filed: Mar. 6, 2014

(65) Prior Publication Data

US 2015/0254713 A1 Sep. 10, 2015

(51) Int. Cl.
| | | |
|---|---|---|
| *G06F 17/27* | (2006.01) | |
| *G06Q 30/02* | (2012.01) | |
| *G06F 17/21* | (2006.01) | |
| *G06F 17/22* | (2006.01) | |

(52) U.S. Cl.
CPC ....... *G06Q 30/0256* (2013.01); *G06F 17/211* (2013.01); *G06F 17/2247* (2013.01)

(58) Field of Classification Search
CPC .. G06F 9/4446; G06F 17/211; G06F 17/2247; G06F 17/227; G06F 17/30905; G06F 9/453; G06F 17/218; G06F 17/24; G06Q 30/0256
See application file for complete search history.

(56) References Cited

U.S. PATENT DOCUMENTS

| | | | | |
|---|---|---|---|---|
| 5,944,790 A | * | 8/1999 | Levy | G06F 17/30905 707/E17.121 |
| 7,873,908 B1 | * | 1/2011 | Varanasi | G06F 8/38 715/744 |
| 7,912,915 B1 | * | 3/2011 | Brin | G06Q 10/00 709/216 |
| 2002/0047859 A1 | * | 4/2002 | Szlam | G06F 17/30899 715/705 |
| 2002/0147757 A1 | * | 10/2002 | Day | G06F 9/4446 718/1 |
| 2003/0001875 A1 | * | 1/2003 | Black | G06F 9/4446 715/708 |
| 2003/0050919 A1 | * | 3/2003 | Brown | G06F 21/6218 |
| 2004/0088155 A1 | * | 5/2004 | Kerr | G06F 17/211 704/8 |
| 2005/0076291 A1 | * | 4/2005 | Yee | G06F 17/3089 715/234 |
| 2007/0162456 A1 | * | 7/2007 | Agassi | G06Q 10/10 |
| 2009/0199080 A1 | * | 8/2009 | Fox | G06F 8/38 715/207 |

(Continued)

OTHER PUBLICATIONS

"Showing/Hiding Parts of Web Page", published: Mar. 2009, publisher: JTricks, pp. 1-2.*

(Continued)

*Primary Examiner* — Wilson W Tsui
(74) *Attorney, Agent, or Firm* — Cooper & Dunham LLP

(57) ABSTRACT

Tools (for example, systems, apparatuses, computer programs, methods, etc.) can be provided to improve content presentation. More particularly, content, such as help content, can be dynamically targeted to the user based on context information included in the content request.

19 Claims, 26 Drawing Sheets

(56) References Cited

U.S. PATENT DOCUMENTS

| | | | |
|---|---|---|---|
| 2011/0131491 A1* | 6/2011 | Lu .......................... | G06F 9/4446 |
| | | | 715/708 |
| 2012/0136922 A1* | 5/2012 | Falkenberg ......... | G06F 17/3089 |
| | | | 709/203 |
| 2014/0006913 A1* | 1/2014 | Gopalakrishna ............................ | |
| | | | G06F 17/30896 |
| | | | 715/200 |

OTHER PUBLICATIONS

U.S. Appl. No. 13/900,132, John Brewer et al., filed Mar. 6, 2014.
David Coveney et al., "WordPress User Guide", Aug. 5, 2013, Interconnect IT Ltd.

* cited by examiner http://www.createwebsite.com/login

Home  News  Create  FAQs  About Us  Contact Info

Welcome to CreateWebsite.com.

Here you can create your own personal website/Blog.

Please login to your account or sign up to get started.

Username

JMLAREN

Password

**********

☒ Login as an Administrator?

Login

Not Registered? Sign Up Here!

Fig. 7A http://www.createwebsite.com/JMcLaren/Edit/Website001

User: Jim McLaren   *Administrator

Website Edited   http://www.printwebhelp.com   Change Website

Publish
Status:
Not Saved

| Page 1 | Page 2 | Page 3 | Page 4 | Page 5 | Add + |

Permalink: http://www.printwebhelp.com/MFP_Guide   Edit

Update

Title: MFP Guide

Edit

Page Attribute

Tags

Theme

Settings/Tools

General MFP Guide

Welcome to the general MFP guide section of PrintWebHelp! Here you'll learn the basics for installing MFPs.

Step 1: When you get your new MFP, plug in the power cord to the outlet and the USB cord to the computer. Both should come with the MFP. If you don't have one, you can find them at your local electronics store.

Robotic Printings

Step 2: After making the connections, you can now install the ink. Check for an opening in the MFP for ink cartridges. Next, install the ink cartridges. Make sure to install the ink cartridges as soon as you receive them. Otherwise, the ink will dry and you will have to buy a new one.

*Sailing Software*
THIS GUIDE IS CERTIFIED BY SAILING SOFTWARE.

*Tip: The installing process for Robotic Printing MFPs may be different than others. Our MFPs must be online before installing can begin.*

Visual   Font   Add Media   Link   Style

Language: English

Fig. 7G

Fig. 7H http://www.documaker.fr/aide/introduction

DocuMaker
*Votre choix pour la création des documents*

| Accueil | Notre Vision | Notre Logiciel | Liens | Aide |

Guide de démmarage rapide

Cet aperçu présentera les fonctions disponibles. Si vous préferez des conseils sur un sujet précis, s'il vous plaît utiliser les lien fournis ci-dessus

Ouvrir une session

Ouvrir une session pour accéder à votre compte.

Entre votre nom d'utilisateur et votre mot de passé dans les champs fournis et appuyer sur le bouton OUVRIR. Une fois cela fait, la page d'accueil de compte apparaîtra.

Si vous avez oublié votre MOT DE PASSE, utiliser le lien approprié pour aller à la page de recherche.

Si vous n'avez pas compte, vous devrez créer un nouveau compte utilisateur. Cliquez sur le lien d'inscription pour continuer. Voir la page d'aide de Inscription pour plus d'informations.

Navigation

La barre de navigation apparaît en haut de chaque page du site et fournit un moyen de vous déplacer facilement d'une section à l'autre du site. La barre de navigation est constitué d'un ruban en haut de liens rouges, une

*Cet article a été écrit par Imprimante Manchots, SA*

Fig. 9D http://www.computergeek/articles/computer/Build_the_Cheapest_High_End_Computer_at_the_Lo

Computer Geek's Computer Articles

*Read up on the latest technology*

| Home | GEEK | Articles | About Us | Contact |

Build the Cheapest High End Computer at the Lowest Price

While PCs nowadays are becoming less expensive due to a large supply of computer components and low demand caused by tablet PCs, buying the latest high end computers still puts a dent in your wallet. The PC with the best specs at the lowest price so far is from Japan's Sekaguchi Computers, Ltd. However, it is still a hefty price at $2,500.00. With such high prices it's a wonder if anyone can afford them at all.

Here we'll show you how to build a high end computer at a low price. We have contacted many experts from various hardware stores to help you assemble the best computer. Below is a list of parts that you will need. You can find them at almost any electronics store.

1 x XZ0495 (deca-core) from GMD (General Micro Devices)
1 x U30503 motherboard (GMD compatible) from Accel Electronics
1 x EE-90 100TB Harddisk Drive from Eastern Digital
2 x N79898 16 GB RAM from SpeedStorage
1 x IAD-87 power supply from PowerDrive
1 x Siren 789 Computer Case Once you have the components, begin by opening the computer case and clean it if it has any dirt or dust. Tiny particles can cause serious damage to the motherboard and other components. Next, take the mother board out of its box and place it carefully into the computer case. Be careful when handling the motherboard as static electricity from your body can cause irreversible damage on it. To prevent this we recommend a wrist strap that absorbs the static

Fig. 9E http://www.computergeek/articles/computer/Build_the_Cheapest_High_End_Computer_at_the_Lov

Computer Geek's Computer Articles
*Read up on the latest technology*

| Home | GEEK | Articles | About Us | Contact |

Build the Cheapest High End Computer at the Lowest Price

While PCs nowadays are becoming less expensive due to a large supply of computer components and low demand caused by tablet PCs, buying the latest high end computers still puts a dent in your wallet. The PC with the best specs at the lowest price so far is from Japan's Sekaguchi Computers, Ltd. However, it is still a hefty price at $2,500.00. With such high prices it's a wonder if anyone can afford them at all.

*Mark's Computer Shop*

Eddy Electronics

Here we'll show you how to build a high end computer at a low price. We have contacted many experts from various hardware stores to help you assemble the best computer. Below is a list of parts that you will need. You can find them at almost any electronics store.

Best Computers, Inc 1 x XZ0495 (deca-core) from GMD (General Micro Devices)
1 x U30503 motherboard (GMD compatible) from Accel Electronics
1 x EE-90 100TB Harddisk Drive from Eastern Digital
2 x N79898 16 GB RAM from SpeedStorage
1 x IAD-87 power supply from PowerDrive
1 x Siren 789 Computer Case Once you have the components, begin by opening the computer case and clean it if it has any dirt or dust. Tiny particles can cause serious

CONTENT DYNAMICALLY TARGETTED ACCORDING TO CONTEXT

TECHNICAL FIELD

This disclosure relates to systems, apparatuses, methodologies, computer program products, etc., for providing branded content and more specifically for providing branded content dynamically targeted to the user based on context information included in the content request.

BACKGROUND

In the current digital age, the trend is that information technology (IT) and digital media are more and more commonly used in everyday activities and are becoming prevalent in all aspects of life. For example, modern web-based search engines allow Internet users to search and retrieve from a tremendous amount of digital information available on the World Wide Web. A user can provide one or more keywords to a search engine via a web browser and in response, a list of web pages associated with the keywords is displayed through the web browser.

Further, users often seek content over a network, even without resorting to a search engine. For example, a user may request to access an application or other content by specifying a URL (uniform resource locator) or activating a hyperlink to such content.

While there is a myriad of content out on the Web, as well as elsewhere in the current world of digital media, it is often the case that a user accessing content, via whatever means, would seek help to comprehend the content with which the user was presented. Many content providers provide, in addition to content, online help pages to help users. However, such help content is typically static. In many instances, the content that is provided does not change, regardless of the user or the circumstance.

There remains a need for improvements in content presentation, such as in the case of help content, as well as in other circumstances.

SUMMARY

Various tools (for example, a system, an apparatus, a computer program, a method, etc.) can be configured to enable a user to obtain content, such as help content, can be dynamically targeted to the user based on context information included in the content request. Thus, the same content can be provided to different users in different manners based on context. The core information content does not change, but the presentation can be customized, to make presented information more relevant to the particular user.

For example, content pages may include tags to delimit context-specific content portions. Thus, the page to be presented is compiled by matching context information (such as corresponding to layout, brand, language, etc.) to specific content portions and assembling the matched content portions accordingly.

For example, a dynamic help content system, in accordance with an aspect of this disclosure, can include an application providing apparatus that provides application functions to users, and in response to a help request from an application user, extracts context information associated with the help request from the application user, and transmits to a content providing apparatus a content request including the context information and requesting specified content. In response to such request, the content providing apparatus causes branded content, from a help page corresponding to the specified content requested by the content request, and branded based on the context information included in the content request, to be returned to the application user.

In another aspect, the application providing apparatus registers for each user amongst plural users branding information corresponding to the user, and in response to the help request from the application user, includes the branding information in the content request transmitted to the content providing apparatus. The content providing apparatus causes the help page content to be branded based on the branding information. The branding information registered by the application providing apparatus may be user-specific or group-specific. For example, such branding information registered for an application user may be independent from the branding information registered by the application providing apparatus for other users amongst plural users.

In another aspect, the branding information registered by the application providing apparatus for the application user may indicate a logo different from logos indicated by the branding information registered by the application providing apparatus for other users amongst plural users.

In another aspect, the branding information registered by the application providing apparatus for the application user may indicate a theme different from themes indicated by the branding information registered by the application providing apparatus for other users amongst plural users.

In another aspect, the context information corresponds to an application page provided to the application user when the application user submitted the help request. That is, the help content that is returned depends on such application page that was provided to the user.

In another aspect of this disclosure, the system includes a screenshot capture apparatus that registers a plurality of screenshots, in which each of the registered screenshots is constituted by corresponding text and image. Under such arrangement, the content providing apparatus transmits a screenshot request including an identifier of the help page and a screenshot parameter corresponding to the context information to the screenshot capture apparatus, and in turn the screenshot capture apparatus determines a requested screenshot based on the identifier of the help page and the screenshot parameter, and returns the requested screenshot to the content providing apparatus.

In another aspect, the screenshot parameter included in the screenshot request transmitted by the content providing apparatus can include a brand, and the screenshot returned by the screenshot capture apparatus includes graphics corresponding to the brand and combined with the help page content identified by the identifier.

In another aspect, the screenshot parameter included in the screenshot request transmitted by the content providing apparatus can include a language or a locale, and the screenshot returned by the screenshot capture apparatus includes text in the language or locale indicated in the screenshot parameter.

In another aspect, the screenshot parameter included in the screenshot request transmitted by the content providing apparatus can include a specified tag, and the screenshot returned by the screenshot capture apparatus includes a portion of the help page that is tagged by show tags matching the specified tag and does not include portions of the help page that are tagged by tags that do not match the specified tag.

In another aspect, the screenshot parameter included in the screenshot request transmitted by the content providing apparatus can include a hide tag, and the screenshot returned by the screenshot capture apparatus excludes a portion of the help page that is tagged by tags matching the hide tag.

In another aspect of this disclosure, a method for providing dynamic content may include one or more of the following:

receiving (or transmitting) a content request including context information and requesting specified help content;

causing branded content, from a help page corresponding to the specified help content requested in the content request, and branded based on the context information included in the content request, to be returned to the application user;

transmitting (or receiving) a screenshot request including an identifier of the help page and a screenshot parameter corresponding to the context information, to a screenshot capture apparatus; and receiving (or transmitting) a requested screenshot corresponding to the identifier of the help page and the screenshot parameter, returned in response to the screenshot request.

determining a brand corresponding to the screenshot parameter included in the screenshot request, and assembling the requested screenshot by combining graphics corresponding to the brand with the help page content identified by the identifier;

determining a language or a locale corresponding to the screenshot parameter included in the screenshot request, and assembling the requested screenshot to include text corresponding to the language or locale indicated in the screenshot parameter.

BRIEF DESCRIPTION OF THE DRAWINGS

The aforementioned and other aspects, features and advantages can be more readily understood from the following detailed description with reference to the accompanying drawings wherein:

FIGS. 7A-7L show respective examples of user interface screens provided on a terminal, according to an exemplary embodiment;

FIGS. 9A-9F show examples of user interface screens provided on a terminal, according to an exemplary embodiment.

DETAILED DESCRIPTION

Figure 1:
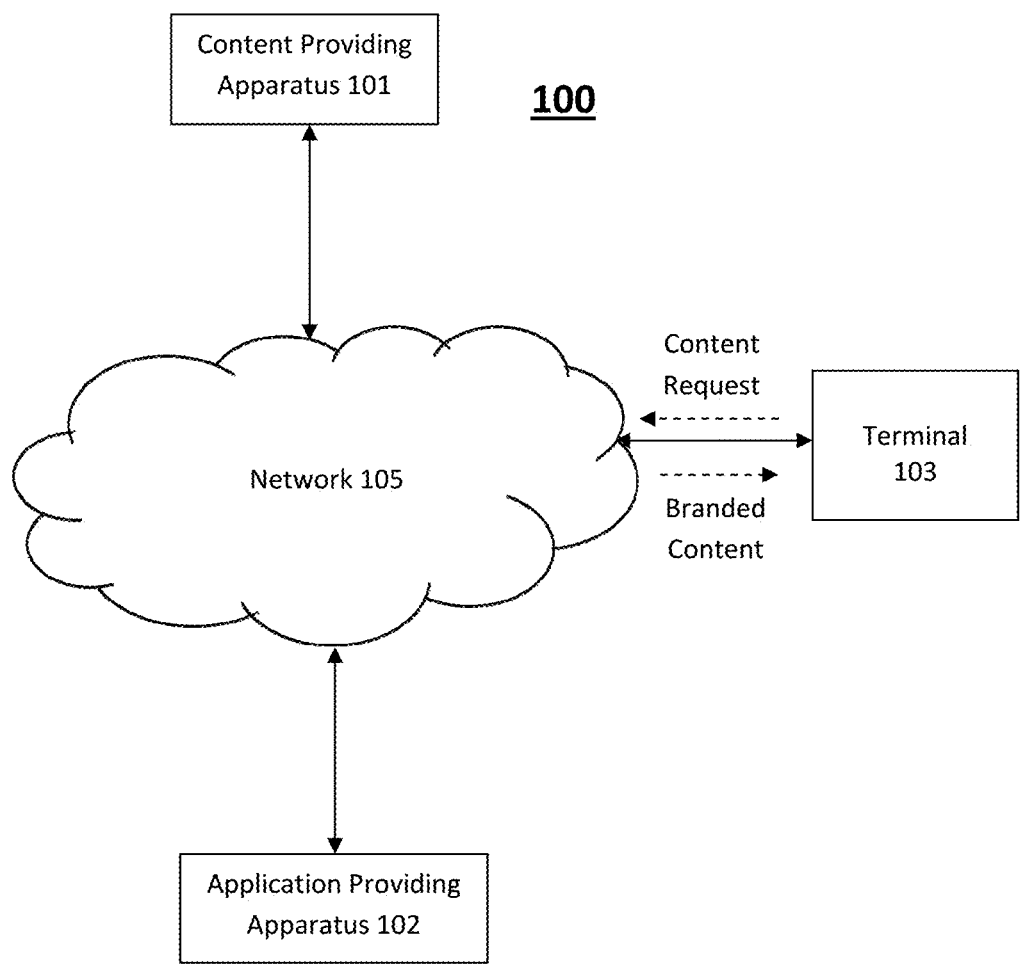
FIG. 1 shows a block diagram of a system for providing dynamic content, according to an exemplary embodiment.

In describing preferred embodiments illustrated in the drawings, specific terminology is employed for the sake of clarity. However, this disclosure is not intended to be limited to the specific terminology so selected and it should be understood that each specific element includes all technical equivalents that operate in a similar manner. In addition, a detailed description of known functions and configurations is omitted when it may obscure the subject matter of the present invention. Referring now to the drawings, wherein like reference numerals designate identical or corresponding parts throughout the several views, there are described tools (such as systems, apparatuses, methodologies, computer program products, etc.) for a print layout tool.

FIG. 1 shows schematically a system 100A that includes a content providing apparatus 101, an application providing apparatus 102 and a terminal 103, all of which are interconnected by network 105. Although only one terminal is shown in FIG. 1, it should be understood that the system 200A can include a plurality of user terminal devices (which can have similar or different configurations).

The content providing apparatus 101 is configured to obtain branded content pages for a user utilizing the terminal 103. When the content providing apparatus 101 receives a request for help content (e.g., application features, error codes, software problems, connectivity issues, hardware malfunctions, etc.) along with context information from the application providing apparatus 102, the content providing apparatus 101 makes a determination regarding what content and brand is appropriate for the help request. The context information may be any type of information relating to the user (or user terminal), such as location (e.g., country, region, city, etc.), operating systems, environment (e.g., work, home, internet café, etc.), profiles (e.g., likes, dislikes, favorites, etc.), employment (e.g., government, NGOs, corporations), projects (e.g., making penguin habitats, administering satellite launching, enhancing existing product lines, etc.), language (e.g., English, French, Arabic, Chinese, Korean, etc.), ethnicity (e.g., German, Russian, Indian, etc.), etc. As for branding, it may be any name, logo, scheme, design, symbol, etc., that identifies any image, product, project, service of an organization.

After making such determination based on the help request and the context information, the content providing apparatus 101 searches for appropriate help pages and brands. The help page may be a webpage that can be accessed by a uniform resource locator (URL). Further, the help page may include more than one webpage. For example, the help page may contain multiple links to other webpages. Once the content providing apparatus 101 locates the help page and brands corresponding to the context information, the content providing apparatus 101 sends it to the application providing apparatus 102 which in turn sends it to the terminal 103 to be displayed.

The application providing apparatus 102 is configured to provide an application to a user. For example the application providing apparatus 102 may be a print server that the user may access through the internet to perform print jobs. In this case, the application providing apparatus 102 is a separate device from the terminal 103 and merely allows the user to access the application without having to install the application on the terminal 103. The application providing apparatus 102 further allows the user to perform a help request. For example, the user may not know how to utilize a certain feature of the application provided by the application providing apparatus 102. Consequently, the user may request help to obtain information regarding how to access that particular feature. In response to this request, the application providing apparatus 102 forwards the help request along with the context information of the user to the content providing apparatus 101. In response, the content providing apparatus 101 locates the help page and brands corresponding to the context information, and sends it to the application providing apparatus 102 which in turn sends it to the terminal 103 to be displayed.

The terminal 103 can be any computing device, including but not limited to a personal, notebook or workstation computer, a kiosk, a PDA (personal digital assistant), a mobile phone or handset, another information terminal, etc., that can communicate with other devices through the network 105. The terminal 103 is further described infra with reference to FIG. 4.

The network 105 can be a local area network, a wide area network or any type of network such as an intranet, an extranet (for example, to provide controlled access to external users, for example through the Internet), a private or public cloud network, the Internet, etc., or a combination thereof. Further, other communications links (such as a virtual private network, a wireless link, etc.) may be used as well for the network 105. In addition, the network 105 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 2A:
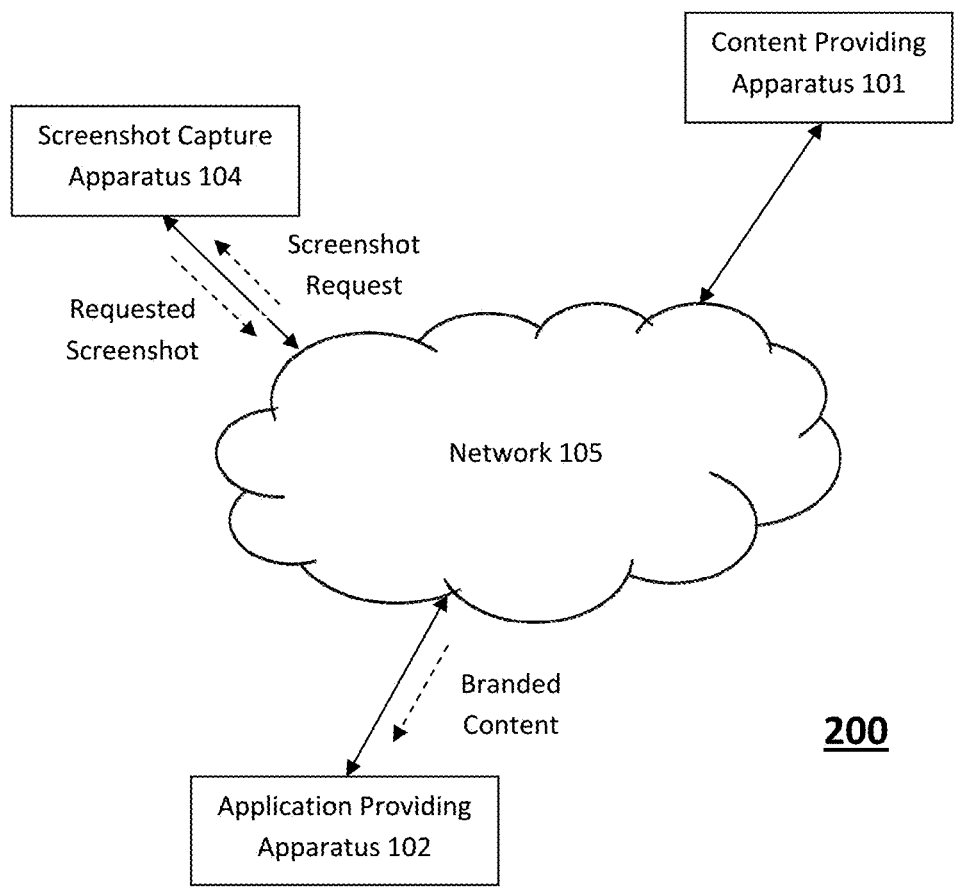
FIG. 2A shows a block diagram of a system for providing dynamic content, according to another exemplary embodiment.

FIG. 2A shows schematically a system 200A, according to another exemplary embodiment. The system 200A is similar to the system 100A of FIG. 1 except that the system additionally includes a screenshot capture apparatus 104.

As discussed supra, the application providing apparatus 102 and the terminal 103 may be distinct devices. However, it should be noted that they may also be the same device. For example, the terminal 103 may be running a program provided by application providing apparatus 102 which is stored in its storage space. This is the case for FIG. 2A where the application providing apparatus 102 is assumed to provide both the application and any features of the terminal 103.

The screenshot capture apparatus 104 can be configured to store screenshots which may comprise both text (e.g., Roman, Greek, Russian alphabet; Chinese, Japanese characters) and images (e.g., graphics, logos, symbols, etc.). A portion of the text and images may be directed toward help content while another other portion may be branded content. Further, each screenshot may be different from another screenshot. For example, one screenshot may contain pre-set brands. The screenshot capture apparatus may manipulate the screenshot to only display a portion of the pre-set brands. As a result, when a user views the screenshot, he or she may not be able to view every brand that was originally on the screenshot. In contrast, in another screenshot, there may not be any text or image corresponding to any brand at all. The screenshot capture apparatus 104 may instead obtain brand content from its storage or through the network 105 and add it to the screenshot while simultaneously reformatting the help content and by extension the screenshot to be able to display the brands.

When the screenshot capture apparatus 104 receives a request from the content providing apparatus 101 for branded help content, the screenshot capture apparatus 104 makes a determination of which screenshot to send back by the screenshot parameter and the help page identifier sent with the request. The screenshot parameter is determined by the content providing apparatus 101 via the context information. For example, the context information may show that the user is from Switzerland and speaks German. Consequently, the content providing apparatus 101 may define screenshot parameters to show that the help content be in the German language and for brands to be familiar with people from Switzerland. The help page identifier may be any combination of characters, symbols or numbers that identify a help page that the content providing apparatus 101 is requesting. For example, the help identifier may be a URL or a name of a file. Once the screenshot capture apparatus 104 determines the appropriate help page and branding, the screenshot capture apparatus 104 may send the branded help content back to the content providing apparatus 101 which in turn sends it to the application providing apparatus 102 to be displayed.

Otherwise, operations of the elements of the system 200 are similar to those discussed in connection with the corresponding elements of the system 100 of FIG. 1.

Figure 2B:
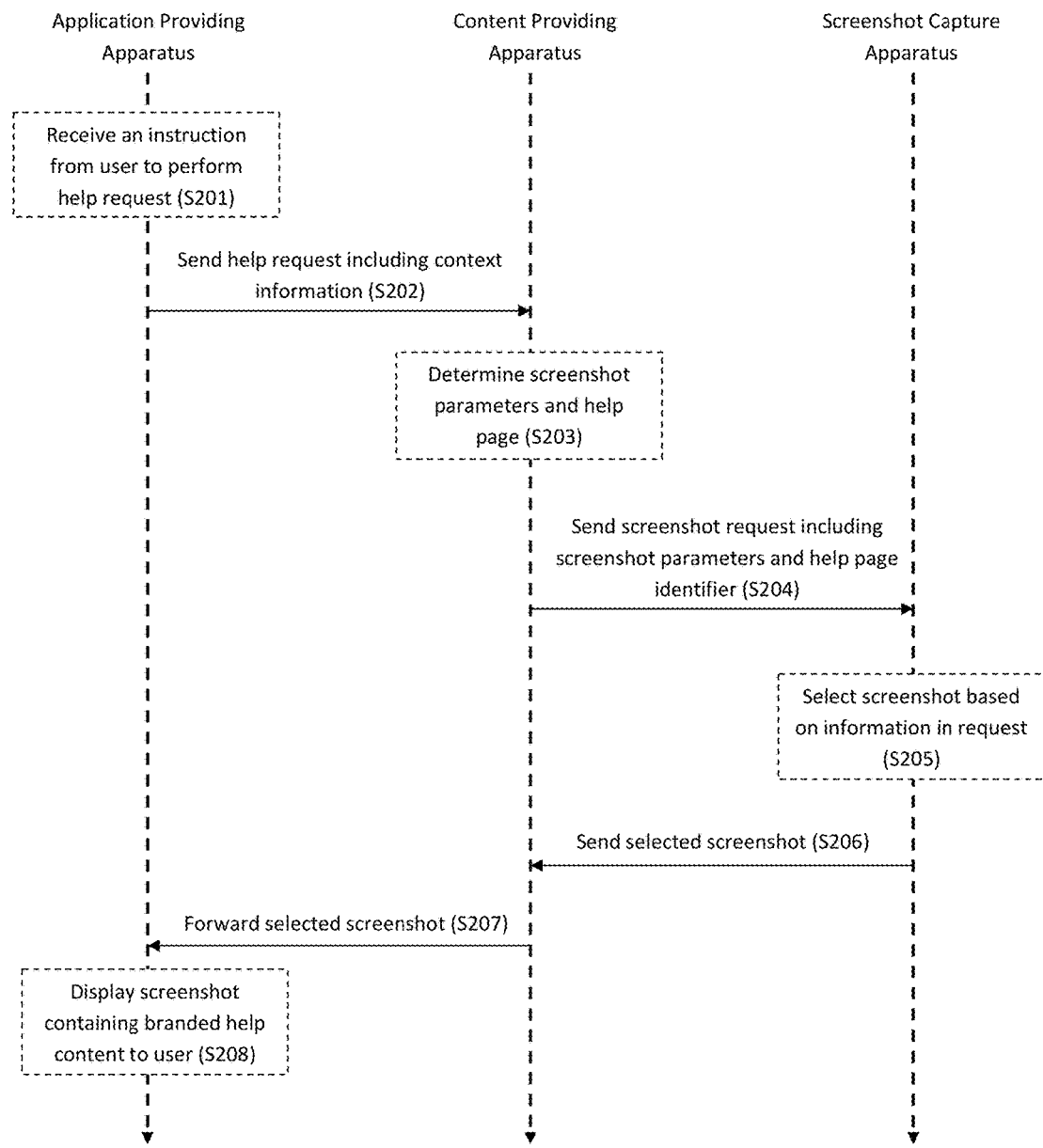
FIG. 2B shows a schematic diagram of an example of communication flow in the system shown in FIG. 2A.

FIG. 2B shows a process performed in, for example, the system 200 (illustrated in FIG. 2A), according to an exemplary embodiment.

A user may be currently using software program provided by an application providing apparatus. However, the user may have an issue or problem relating to the software program. For example, there may be a feature that the user may have been able to access to in a previous version of the software program but the user cannot find in the current one. Thus, the the user may instruct the application providing apparatus to obtain help content to fix this issue (S201). When this happens, the application providing apparatus sends a help request to a content providing apparatus along with context information regarding the user (S202). It should be noted that in the case that the application providing apparatus and the content providing apparatus are on the same device, the application providing apparatus may simply perform a program call. In other circumstances, the application providing apparatus may send the help request and the context information through the network to the content providing apparatus instead. Next, the content providing apparatus determines a help page and screenshot parameters corresponding to the help request by the user and the context information, respectively (S203). It should be noted that while the content providing apparatus may know where to access the help page, the content providing apparatus may only be able to access a help page that has no branded content in it.

Thus, after making the determination, the content providing apparatus sends a screenshot request including the help page and the screenshot parameters to a screenshot capture apparatus in order to obtain a help page that includes branded content (S204). In response to the request by the content providing apparatus, the screenshot capture apparatus utilizes the received information (e.g., screenshot parameters and help page identifier) to determine which screenshot stored in the screenshot capture apparatus is appropriate to send back (S205). After the screenshot capture apparatus finds a screenshot that corresponds to the screenshot parameters and help page identifier, the screenshot capture apparatus sends it to the content providing apparatus (S206). The content providing apparatus in turn forwards the screenshot to the application providing apparatus (S207). Once the application providing apparatus receives the screenshot, the application providing apparatus displays it to the user (S208).

Figure 2C:
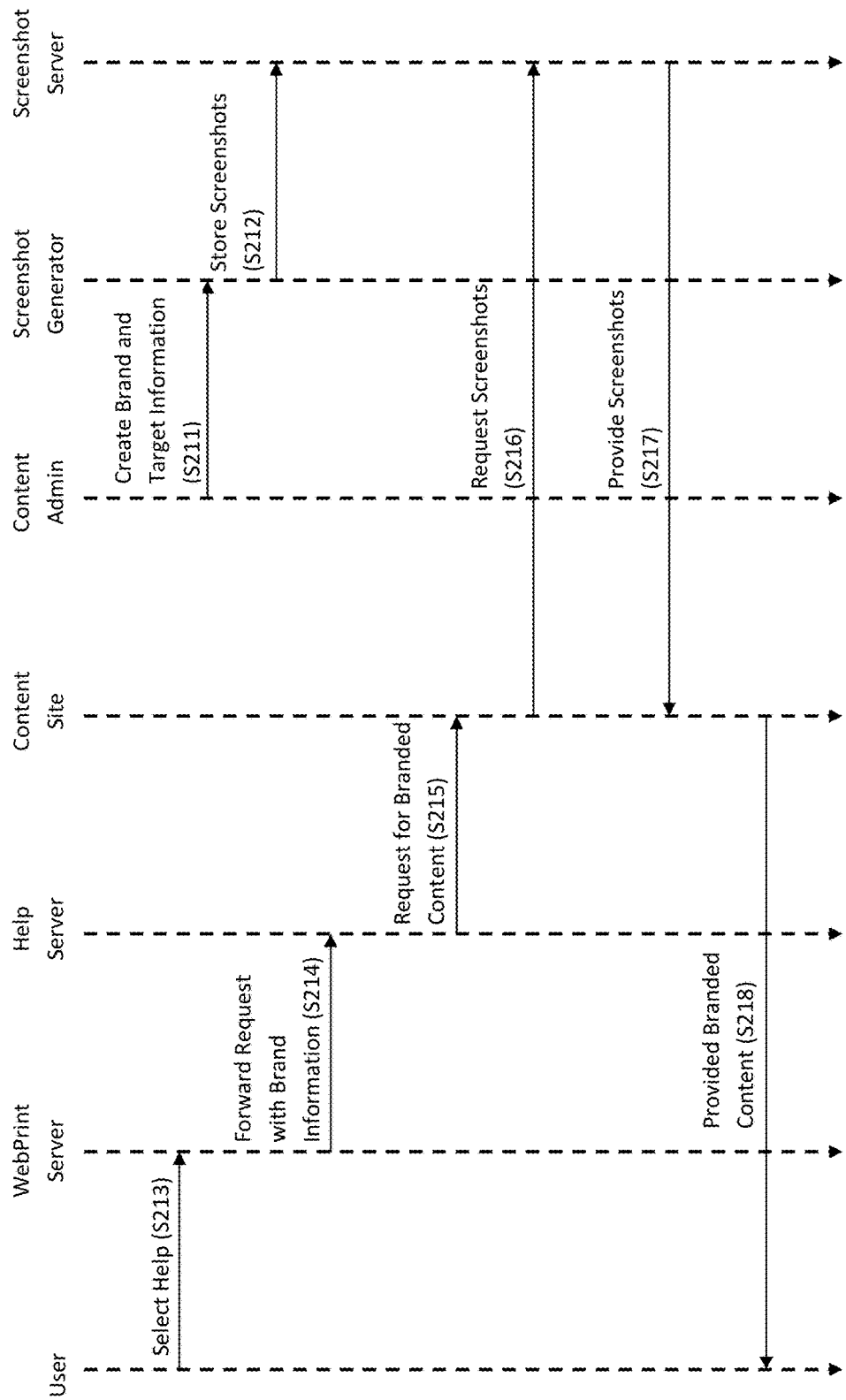
FIG. 2C shows a schematic diagram of an example of communication flow, according to another exemplary embodiment.

FIG. 2C shows a process performed in, for example, the system 200 (illustrated in FIG. 2A), according to another exemplary embodiment.

For example, a content administrator (content admin) may be requested to create screenshots to provide help content that includes branded information, by employing a screenshot generator. The screenshot generator may be any type of device such as a computer which contains a program that allows the content administrator to combine help pages and brands into a single content. Next, after the content admin is finished with creating a screenshot (S211), the screenshot generator stores it into the screenshot server (S212). The content admin may create multiple screenshots for various specific help requests (e.g., error codes, hardware problems, connectivity issues, software malfunctions, etc.). Further, in some cases, there may be more than one screenshot for each specific help request. For example, a screenshot corresponding to a help request for online problems may have multiple variations such as containing different brands or be in another language. Consequently, there may be many screenshots located in the storage space of the screenshot server. After a number of screenshots are stored in the screenshot server, the requested screenshots may be retrieved from storage.

As an example, a user accessing a webprint server which allows the user to send print jobs to it to be printed may encounter a problem with the webprint server or the user may need help with a certain feature. Thus, the user may send a help request to the webprint server (S213) which in turn sends the request to a help server (S214). The help server may be a server created by a consultant company which is hired by the company who created the webprint server. In addition, the help server may know where to access a help page corresponding to the help request, but may only be able to access a help page that has no branded content in it. Consequently, the help server forwards the help request along with brand information (e.g., context information) to the content site which knows where to obtain branded help content (S215). The content site may utilize the brand information to develop screenshot parameters which tell the screenshot server what type of branded content is appropriate for the user. Next, the content site forwards the request along with the screenshot parameters to the screenshot server (S216). In response, the screenshot server uses the information obtained from the content site to find the screenshot corresponding to the help request and the screenshot parameters. After the screenshot server obtains the screenshot, the screenshot server sends it to the content site (S217) which in turn forwards it to the user (S218).

Any combination of the user device (user), webprint server, help server, content site and content site may be located on a single device.

Figure 3:
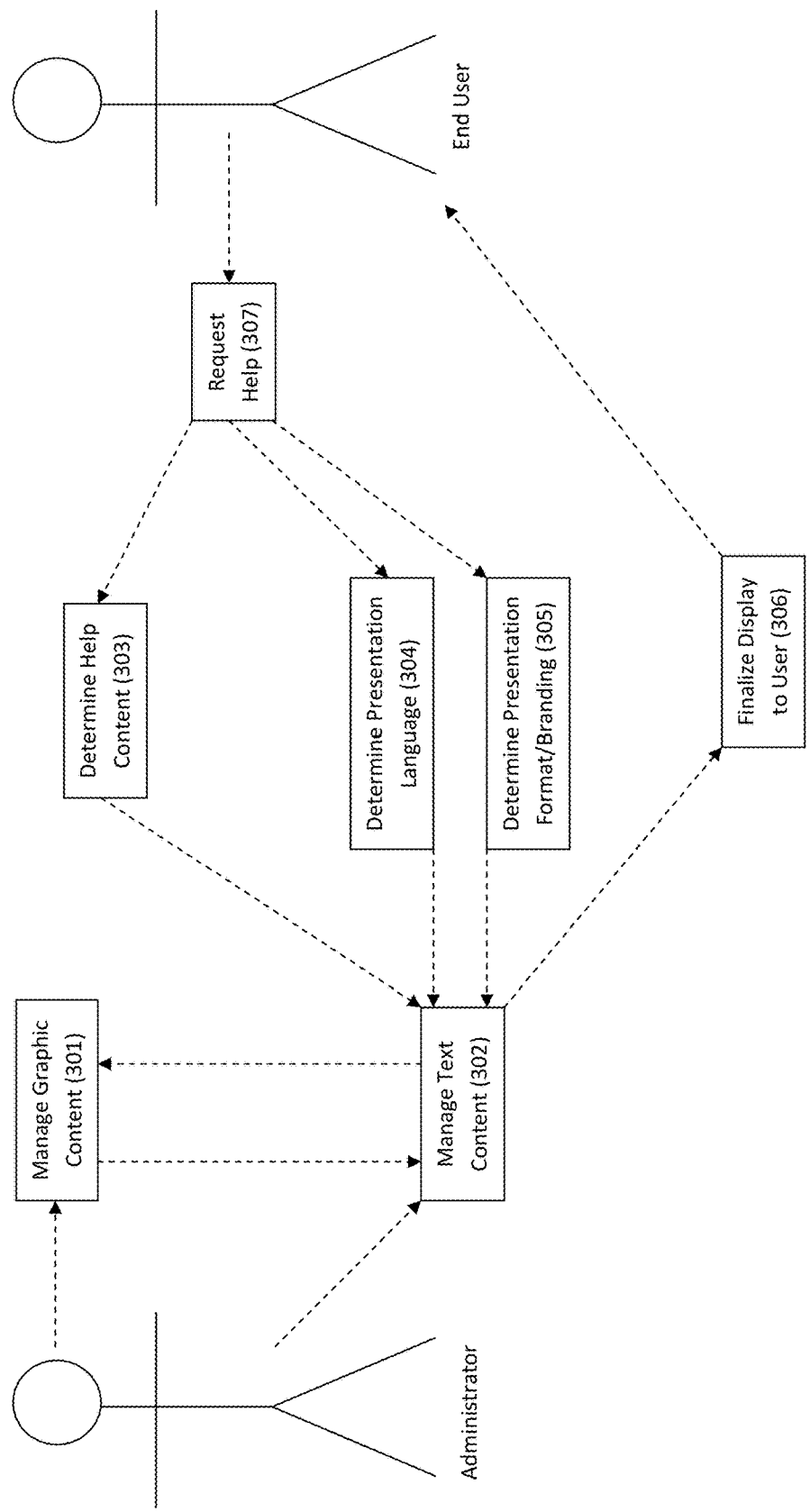
FIG. 3 shows a diagram of a workflow in a method for providing dynamic content, according to an exemplary embodiment.

FIG. 3 shows schematically a block diagram of how a user and an administrator interact in a system such as the systems shown in FIGS. 1 and 2A which provides branded help content to a user.

The administrator may be an employee at an organization who manages content on a server. The content may comprise help information for issues encountered by the user and branding. Further, the content may contain both text (e.g., Roman, Greek, Russian alphabet; Chinese, Japanese characters) and graphics (e.g., images, logos, symbols, etc.). Thus, it may be the role of the administrator to manage the both the graphical (301) and text content (302). When a user requests help, several determinations are made such as help content (303) which may include error codes, hardware problems, connectivity issues, software malfunctions, etc., presentation language (304) which may include English, French, Hindi, Arabic, etc., and presentation format/branding (305) to be sent to the user. After the determination is made, the content is finalized and sent to the user (306).

Figure 4:
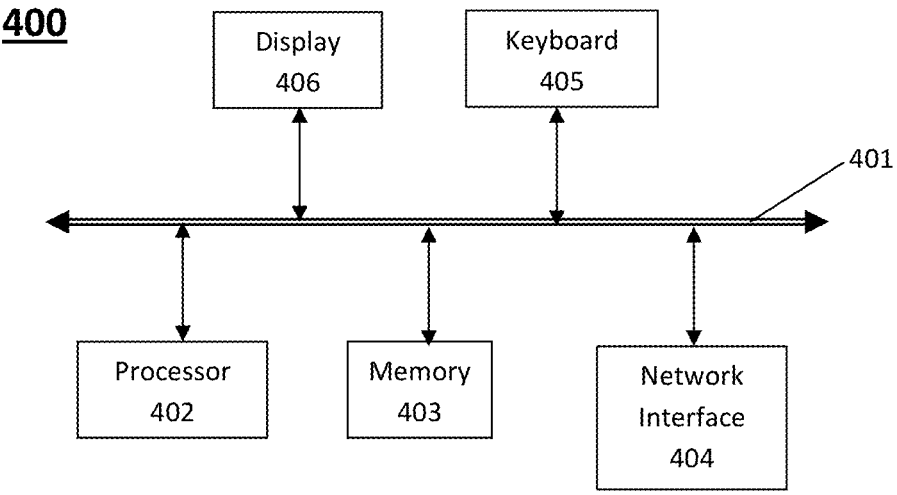
FIG. 4 shows a block diagram of an exemplary configuration of a computing device that can be configured to operate as a server or another service providing device.

FIG. 4 shows an exemplary constitution of a computer 400 that can be configured (for example, through software) to operate (at least in part) as the content providing apparatus 101 and the application providing apparatus 102 of FIG. 1 and the screenshot capture apparatus 104 of FIG. 2A. The computer 400 includes a processor (or central processing unit) 402 that communicates with a number of other components, including a memory or storage part 403, network interface 404, keyboard 405 and display 406, by way of a system bus 401. The computing device 400 may be a special-purpose device (such as including one or more application specific integrated circuits or an appropriate combination of conventional component circuits) or a software-configured personal computer or computer workstation with sufficient memory, processing and communication capabilities to operate as a terminal and/or server, as would be appreciated to those skilled in the relevant arts.

Additional aspects or components of the computing device 400 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 5:
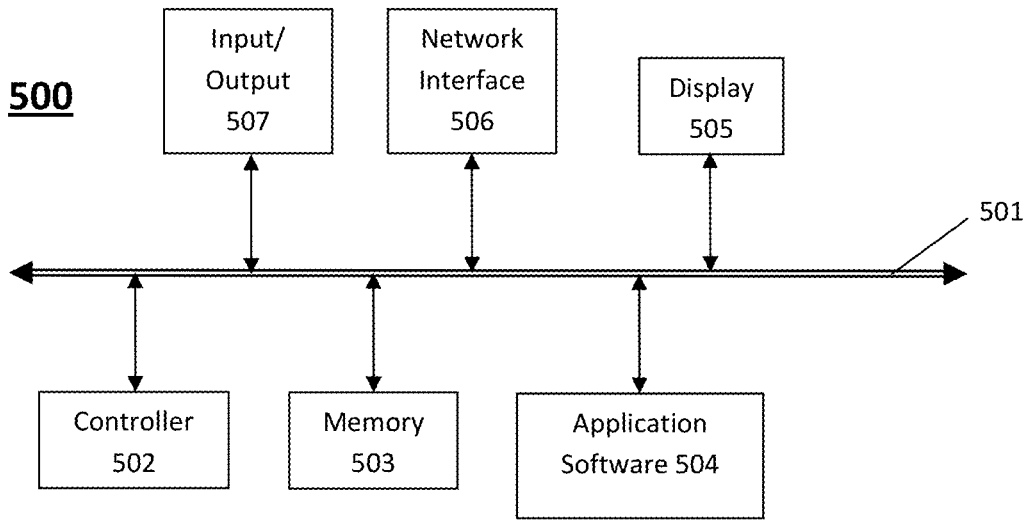
FIG. 5 shows a block diagram of an exemplary configuration of a terminal.

FIG. 5 shows an exemplary constitution of the terminal 103 of FIG. 1 (for example, as a computer). In FIG. 5, a computer 500 includes a controller (or central processing unit) 502 that communicates with a number of other components, including memory 503, application software 504, display 505, network interface 506 and input/output (such as mouse, keyboard, touchpad, stylus, microphone and/or speaker with voice/speech interface and/or recognition software, etc.) 507, by way of an internal bus 501.

The memory 503 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), 20 etc.].

The network interface 506 provides a connection (for example, by way of an Ethernet connection or other network connection which supports any desired network protocol such as, but not limited to TCP/IP, IPX, IPX/SPX, or NetBEUI) to the network to which the computer 500 is connected (e.g., network 105 of FIGS. 1 and 2A).

The application software 504 is shown as a component connected to the internal bus 501, but in practice are typically stored in storage media such as a hard disk or portable media, and/or received through the network, and loaded into memory 503 as the need arises.

Additional aspects or components of the computer 500 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 6:
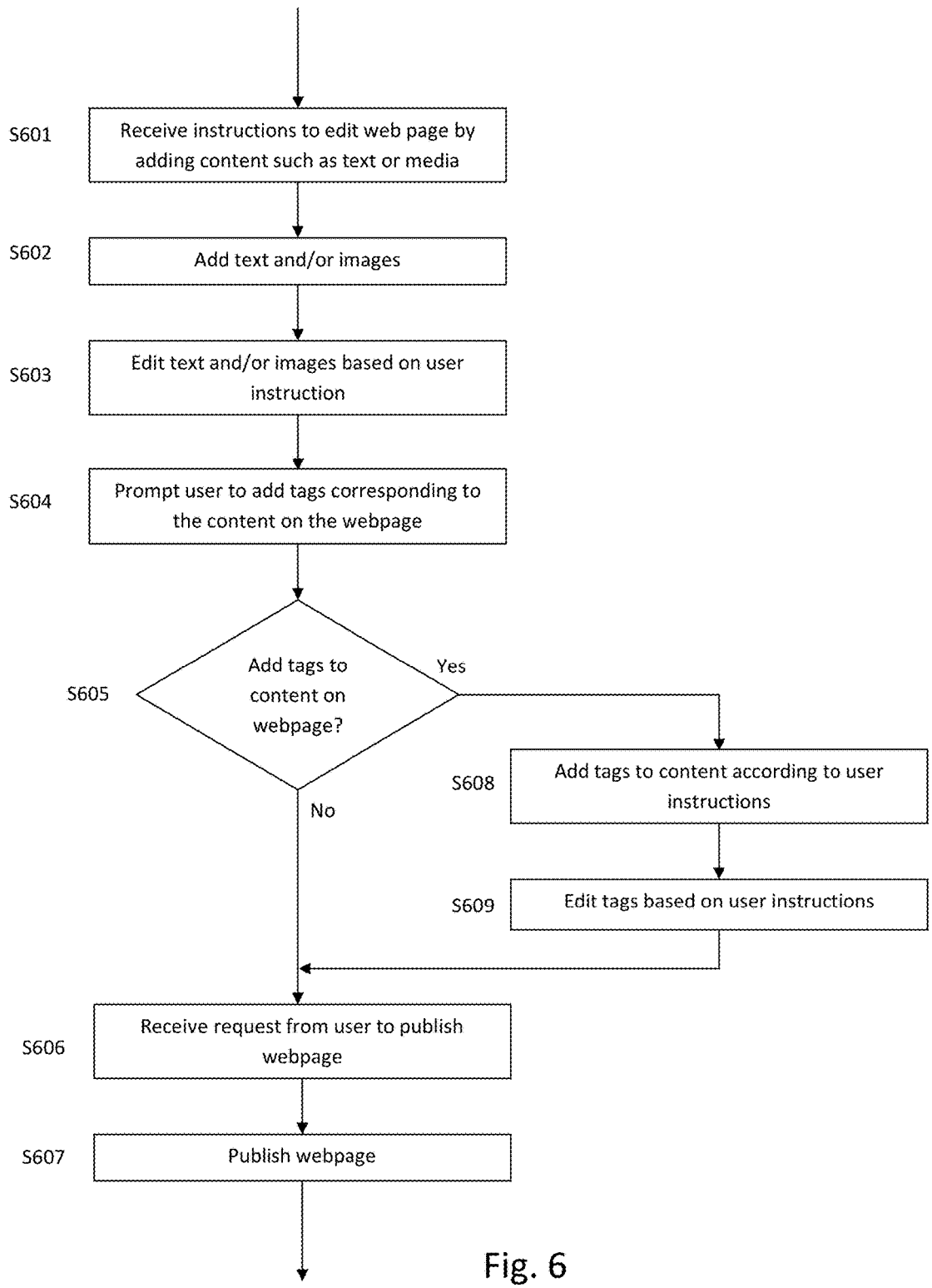
FIG. 6 shows a flow chart of a method for providing dynamic content, according to an exemplary embodiment.

FIG. 6 shows a process performed by a screenshot capture apparatus (e.g., 104), for creating a website, according to an exemplary embodiment, as discussed below.

An employee at a company may be developing a website which contains help content to be viewed by users who need assistance with their issues. For example, an employee such as "Jim McLaren" may be currently working on such a website to provide aid to customers who are installing or seeking help for problems relating to printing devices (e.g., MFPs, printers, etc.). The company that "Jim" works for may be a type of consultant firm which was hired to provide help content to various products. To facilitate creating a website, the "Jim" who is the user may utilize a website making program via a website such as "CreateWebsite.com". The user may have access to software on his or her computer for creating a website as well.

Figure 7B:
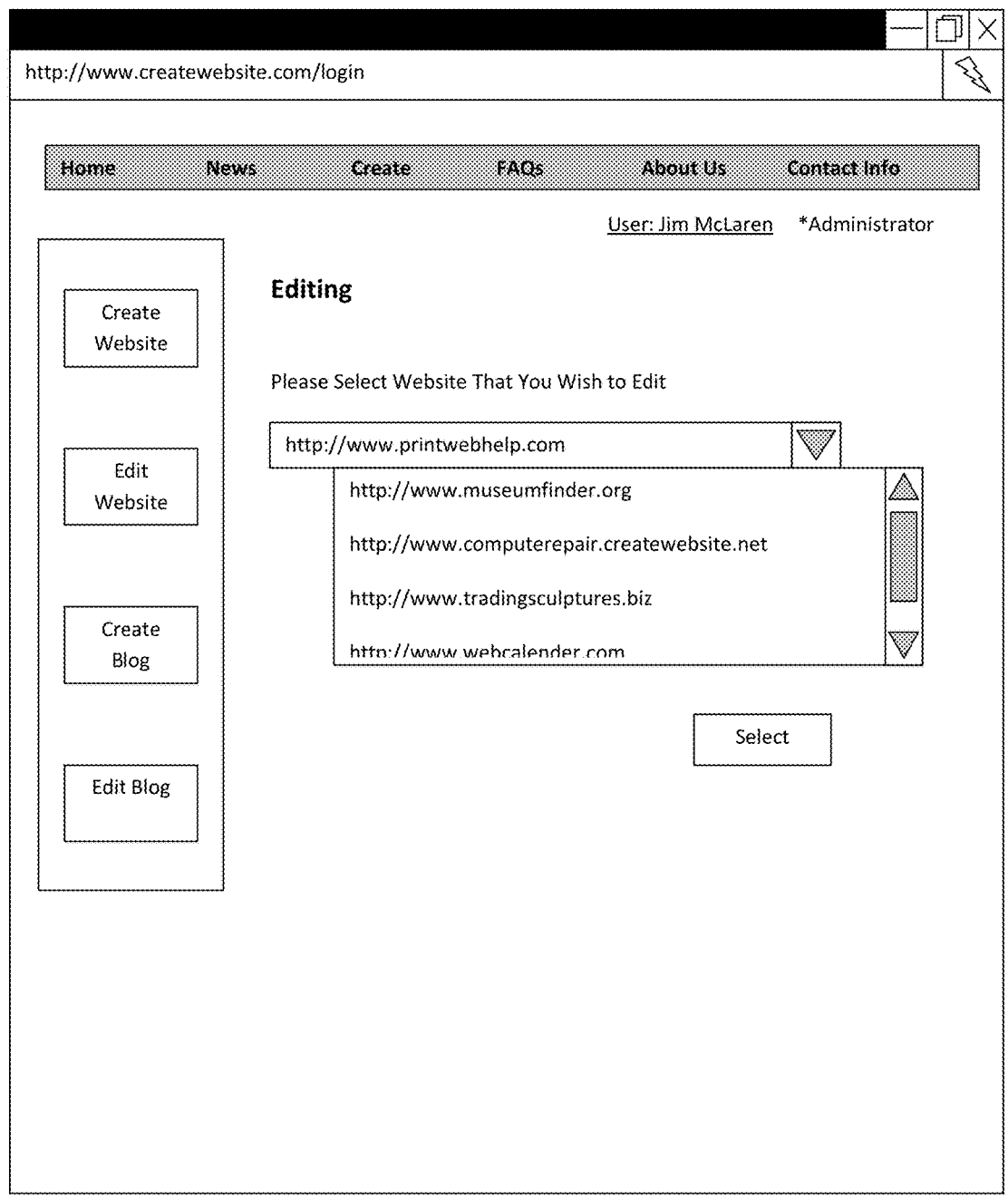

To proceed with accessing "CreateWebsite.com", the user first inputs user credentials, as shown in FIG. 7A, and has the option to login as an administrative user. There may be cases in which only an administrative user can have privileges or access to certain features of "CreateWebsite.com". Consequently, it may be more convenient for the user to login as an administrative user. In this case, the user selects the option to login as an administrative user. After the information sent by the user has been verified, he or she is then presented with a list of functions that the user can select, as shown in FIG. 7B. For example, as shown on the left hand side menu bar, the user may select to create a website/blog or edit an existing website/blog. In this case, the user has selected to edit a website previously created. As shown, "Jim" has made many websites with each being a different topic. For example, the websites may pertain to different subsidiaries of the company that employs the user. The company may be in the business of trading sculptures or computer repair as well. In addition, some of the websites may be dummy websites which exist only for experimental purposes. In this case, the user selects to edit the website "www.printwebhelp.com".

Figure 7C:
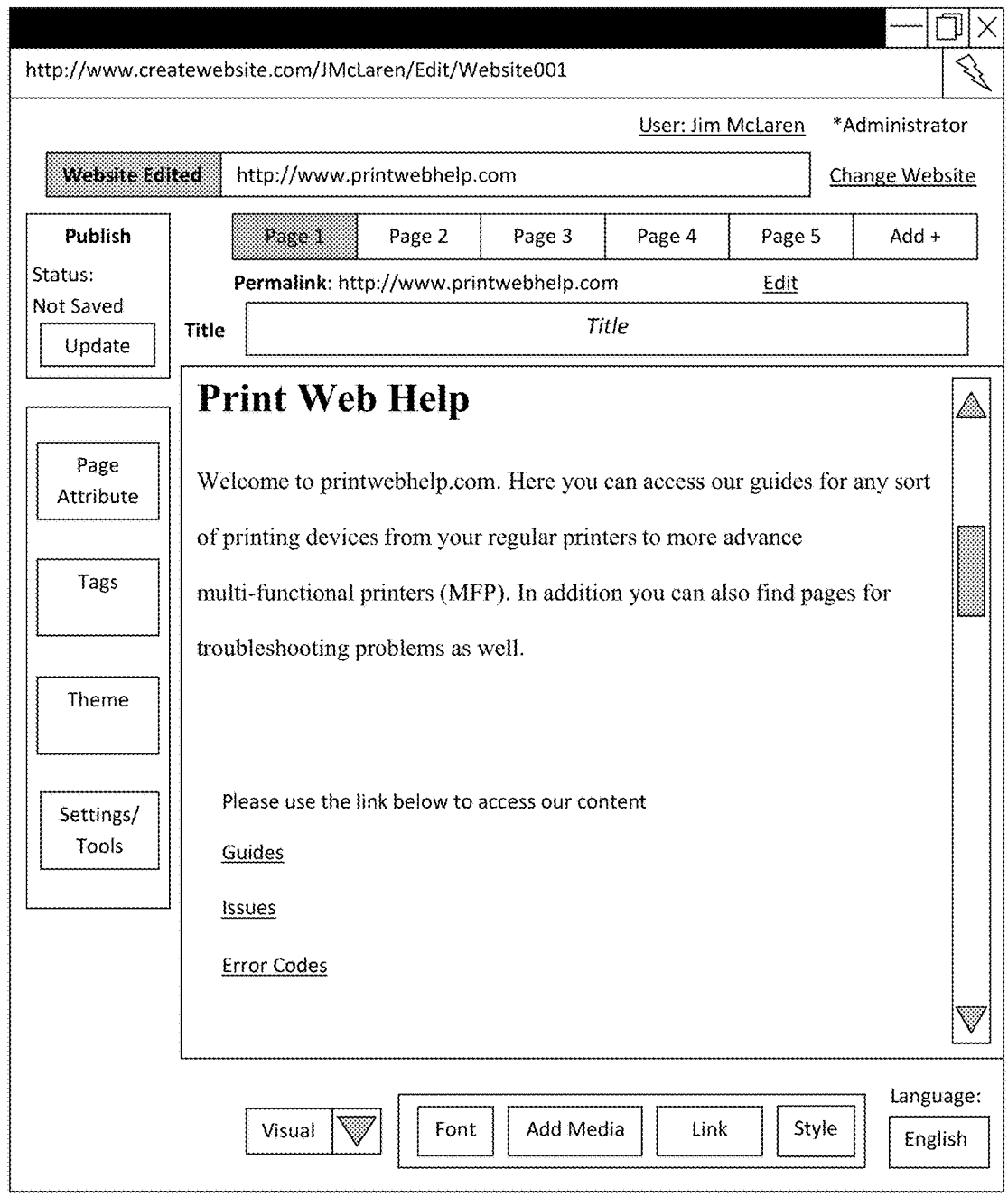

Next, after selecting the website, the user is displayed a screen which contains the first page of "www.printwebhelp.com", as illustrated in FIG. 7C. At the top of the screen, the user is shown the name of the website that he or she is editing. The user may change the website by clicking the "Change Website" button. Below the website name is a menu containing a list of pages that the user has created. Although the menu displays the name of each page as numbers, the user may be provided the option to change the name to whatever the user wants. Further below the website name is an option for the user to change the link of the page. For example, should the user create a second web page, he or she may create a link such as "www.printwebhelp.com/printers" or "www.printwebhelp.com/MFP". The link serves as a sort of address to access that particular page. In addition, below the link, there is also an option for the user to edit the title of the content page.

On the left hand side of the page, there are several buttons (e.g., "Page Attribute", "Tags", "Theme") that the user may utilize to further edit each webpage (S601). The "Page Attribute" button allows the user to set the hierarchy of each page in the website. The "Tag" button allows the user to attach tags to content on the webpage. The "Theme" button allows the user to change the background of the webpage or the design of the user interface. At the bottom of the page is another menu containing features that may be useful for the user. As shown, there are options for the user to format the text of the page. For example, the user may adjust the font of the text by utilizing the "font" button or format the paragraph of the text by the "style" button. Further, the user may also add images to the webpage by the "Add Media" button. In addition, the user may create links on the webpage using the "Links" button. For example, as shown in FIG. 7C, the webpage has several links (e.g., "Guides", "Issues" and "Error Codes"). The user is not required to place the entire address (e.g., URL) of the link onto the webpage. As illustrated the user may substitute the address with other characters (e.g., "Guides") instead to save space. The user may also designate a language (e.g., English, French, German, Italian, Russian, etc.) for the webpage as well. After the user has finished editing the webpage, the user may press the "Update" button (S606) to publish the webpage (S607) which allows others to access the webpage.

Figure 7D:
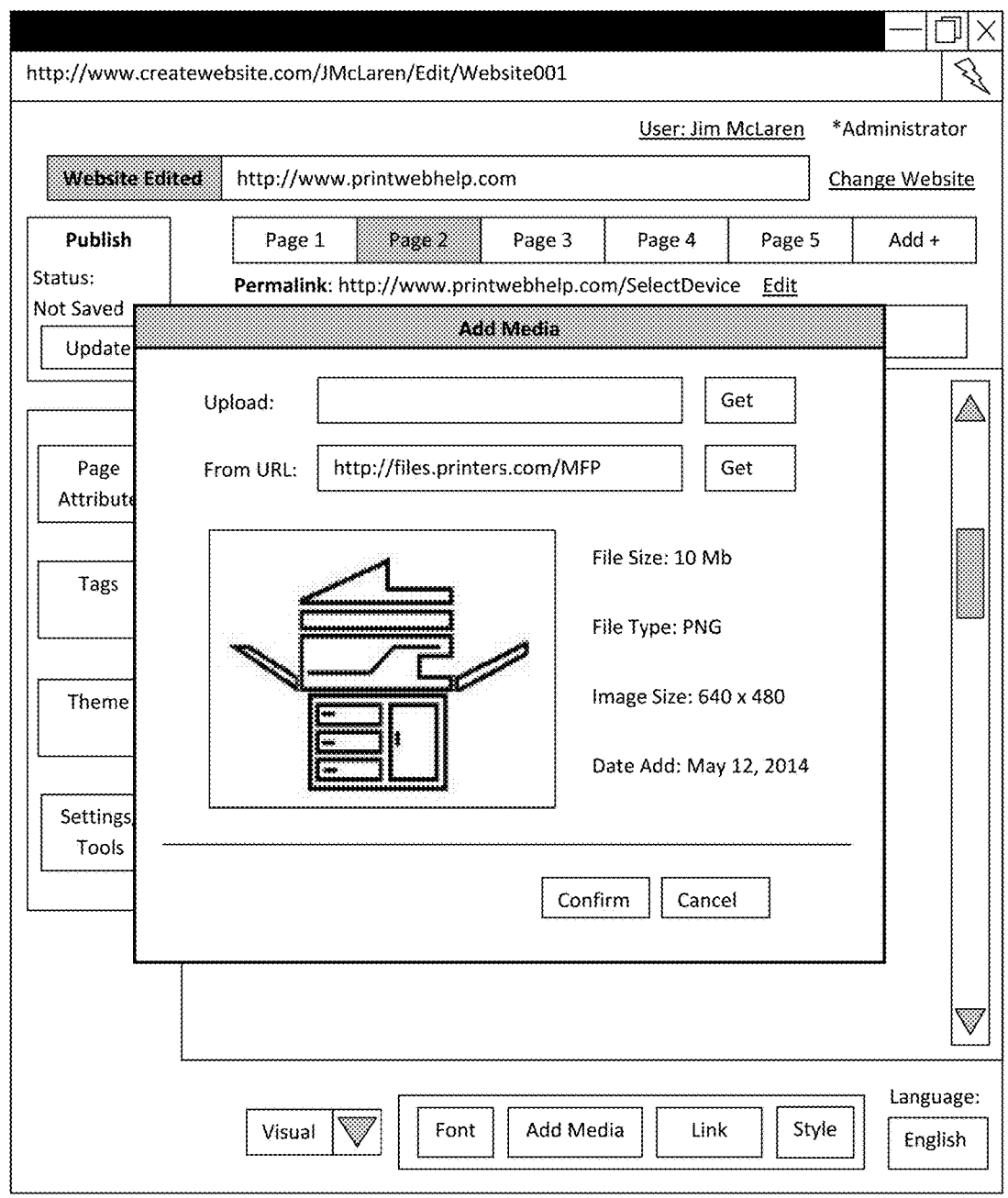

In addition, to adding text, the user may add media to the webpage which may be in the form of images (e.g., jpeg, tiff, png, bmp, etc.) or videos (e.g., mp4, avi, wmv, fly, mov, etc.) as well (S602). The user may access this option by pressing the "Add Media" button which causes a screen, such as the one shown in FIG. 7D, to be displayed to the user. The user may obtain media via multiple ways. For example, the user may upload files containing media from a storage device on the user's computer. On the other hand, the user may also obtain media from the network via a URL. After the user has performed the selection, he or she is shown information corresponding to that selection. In this case the user has selected to obtain via a URL an image of an MFP. As a result, information such as the file size, file type, image size, and date added are shown to the user. After the user is satisfied with his or her selection, the user may press the "Confirm" button to finalize the selection.

Figure 7E:
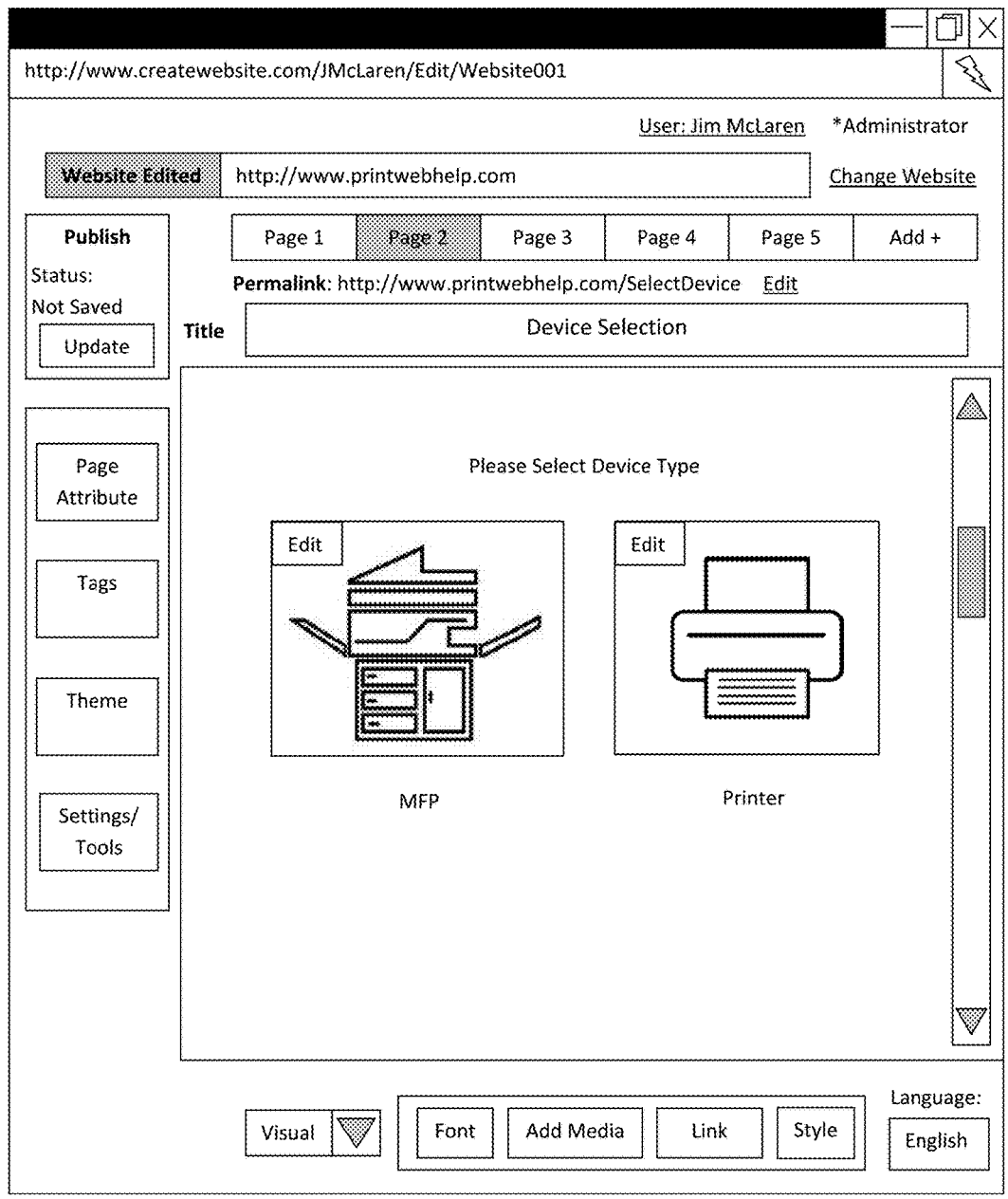

As stated previously, "Jim" is creating help content for those in need of assistance with their printing devices. In this case, after creating the home page shown previously in FIG. 7C, "Jim" may first create a page for a general guide regarding installing MFPs and printers. As the MFP and the printer are distinct devices with different installation procedures, the user may decide to create a webpage such as shown in FIG. 7E which allows the user to select a guide. In this case the web page address is "www.printwebhelp.com/SelectDevice" and the user may access the page from the link "Guides" in FIG. 7C.

Figure 7F:
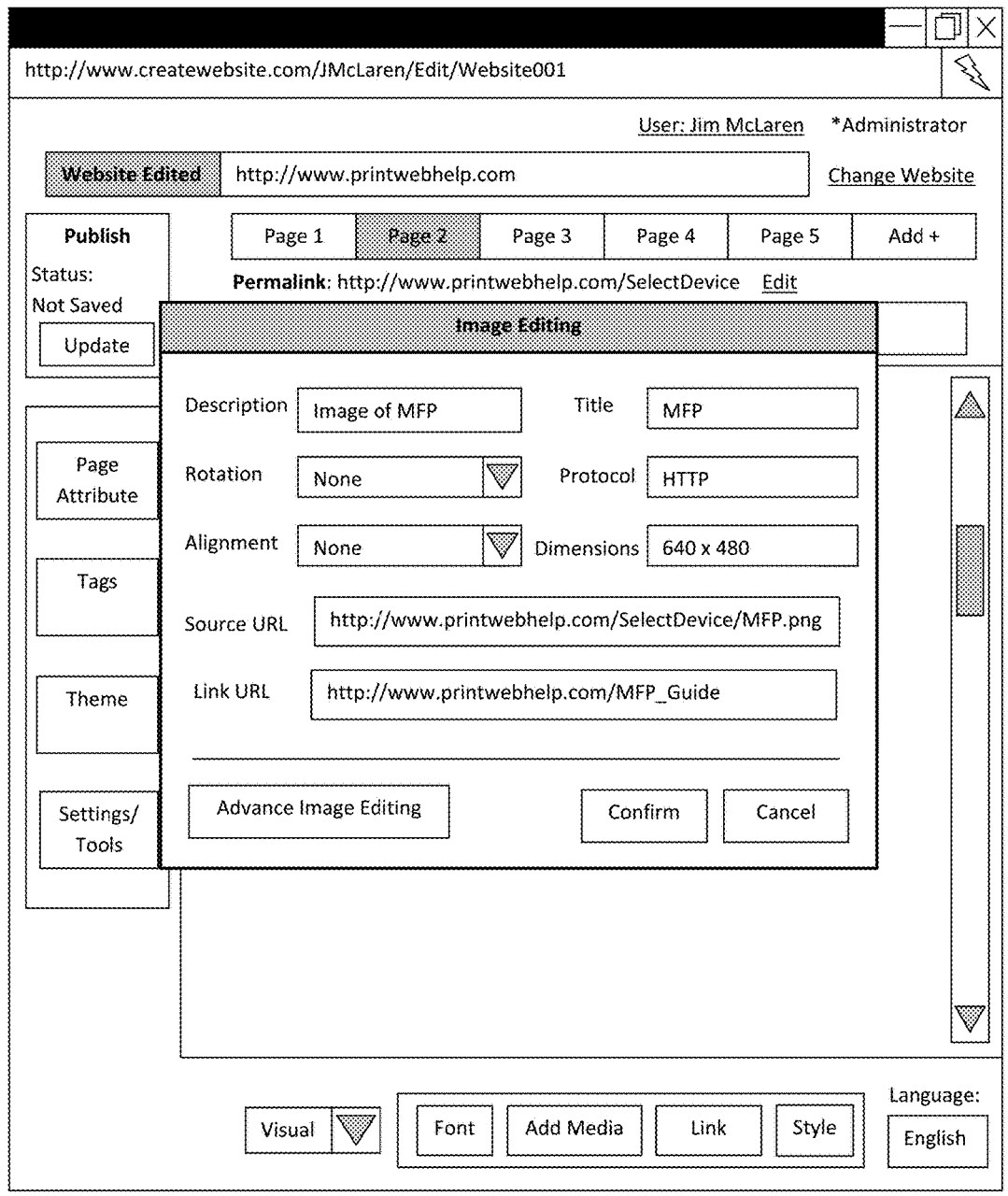
Figure 71:
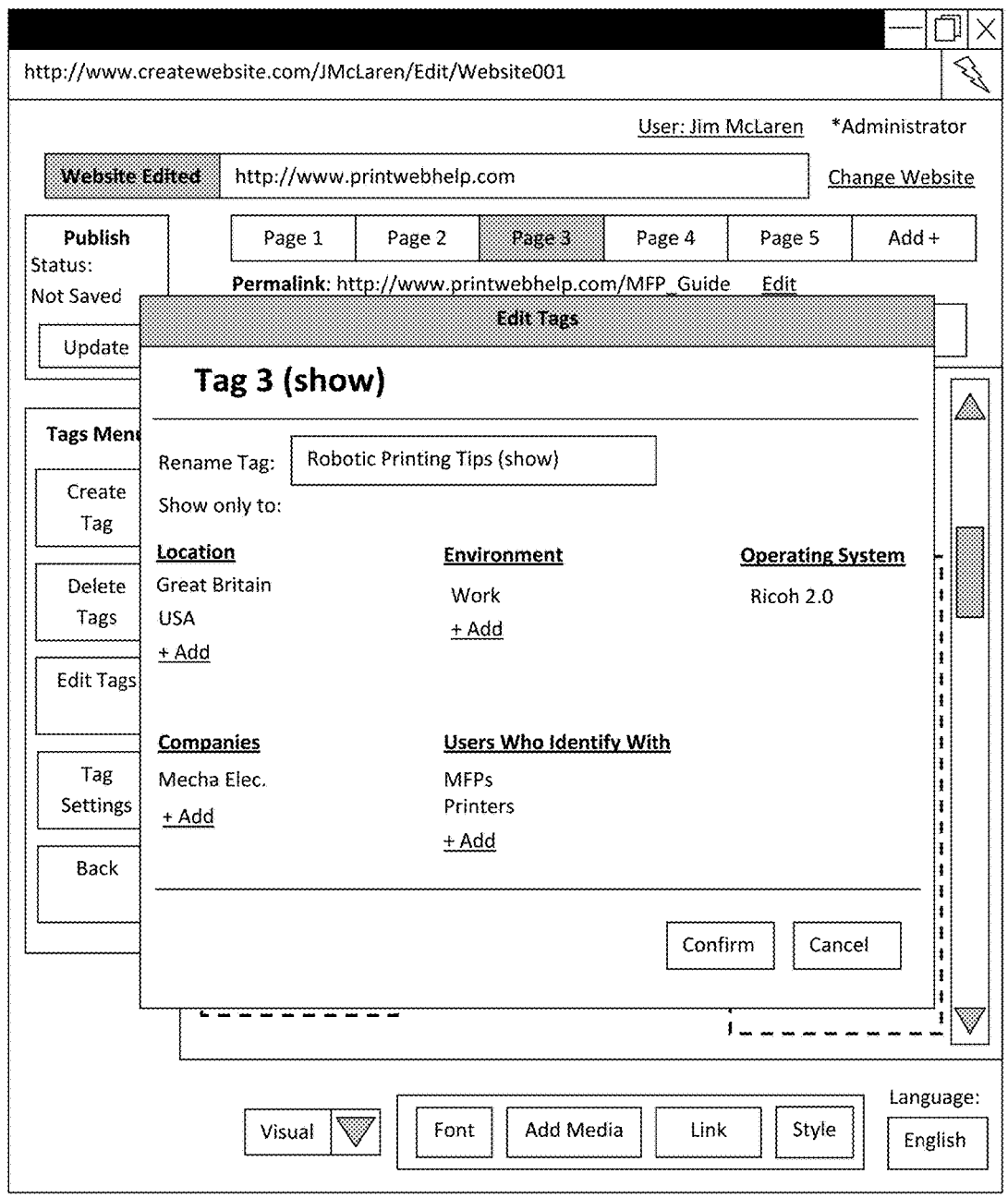

As shown, FIG. 7E illustrates a webpage that includes two images which are pictures of an MFP and a printer. Each image has an "edit" icon on the top left corner. The "edit" icon allows the user to perform editing of each image (S603). However, the user may also remove or hide the "edit" icon from each image. By pressing the "edit" icon, the user is provided with a screen such as illustrated in FIG. 7F. Here the user may edit or change the properties of the image. For example, the user may insert a description regarding the image or give it a title. The user may also change the physical properties of the image through the "Rotation", "Alignment" and "Dimensions" options. Further, the user may set a Link URL for the image which causes anyone who clicks on the image to be redirected to that URL as well. In a case that the Link URL and the Source URL are the same, when the user clicks on the image, he or she may be sent to a webpage which contains only the image in a larger size. In this case, the user has selected to link the image to the URL "http://www.printwebhelp.com/MFP_Guide" which contains the webpage for guiding users regarding MFP installation.

Next, "Jim" may create a webpage containing a guide for installing an MFP, as illustrated in FIG. 7G. As shown, the content on the webpage contains both text and images. A portion of the content directly relates to the MFP and its installation procedure. However, there are other content not directly related to the guide as well. For example, branded information on the webpage may include a logo of a company named "Sailing Software" with a caption underneath it describing the guide as "certified by Sailing Software".

Branding may be any form of name, logo, scheme, design or symbol that identifies any image, product, project, service of an organization. For example, a logo such as a star on a toaster may let users know that the toaster was made by a "Star Appliance Corporation" or a distinctive user of colors and shapes on a soda bottle may identify its relationship with a "Fizzy" product line of a "National Soda Corporation". In this case the company "Sailing Software" may be a company famous for its accurate and easy-to-read guides on electronic devices. Thus, many users who read articles or guides for electronic devices may be more inclined to read ones certified by "Sailing Software". Consequently, it may be beneficial for "Jim" to place logos or symbols identifying the guide as approved by "Sailing Software" since they not only allow users who read the guide to be more trusting of it but also because the contents is allowed to be associated with "Sailing Software".

Also located on the same webpage is another branding, which in this case is an image of a robot with a tip underneath it. Thus, one might determine that it is not necessary to place a logo or a symbol along with the company's name onto the webpage to be designated as branding. Tips from companies which were involved in the making of the guide or the creation of the product described in the guide may also be counted as branding as well. For example, "Robotic Printings" may be a company that specializes in selling MFPs and has a large share (30%) of the market. Further, there may be slight differences in installing MFPs made by "Robotic Printings" and other MFPs. For example, "Robotic Printings" MFPs may need to be connected to the internet before the user can begin installing software (e.g., drivers, graphical user software, etc) for the purpose of security. Information such as this may be important to users since many of them own "Robotic Printings" MFPs. Further, similar to the "Sailing Software" case, the guide also benefits by being associated with "Robotic Printings" as users may realize that it may be important enough to cause "Robotic Printings" to place such a tip on it.

However, the branding may not always appear to every user. For example, the "Robotic Printing" branding may appear to a user "Matt" but not to a user "Eliza". To facilitate which user sees what branding, the user may create tags around each branding, such as illustrate in FIG. 7H. To access the feature for creating tags, the user presses the "Tags" button which brings up a new menu (S604). The menu includes features for creating, editing and deleting tags. To create a tag, the user may press the "Create Tags" button (S605). Next, the user may draw an outline of the tag around an image or text that he or she wishes to show or hide to certain other users (S608). After the user has created a tag, a label to help identify tags may appear adjacent to it.

Figure 7H:
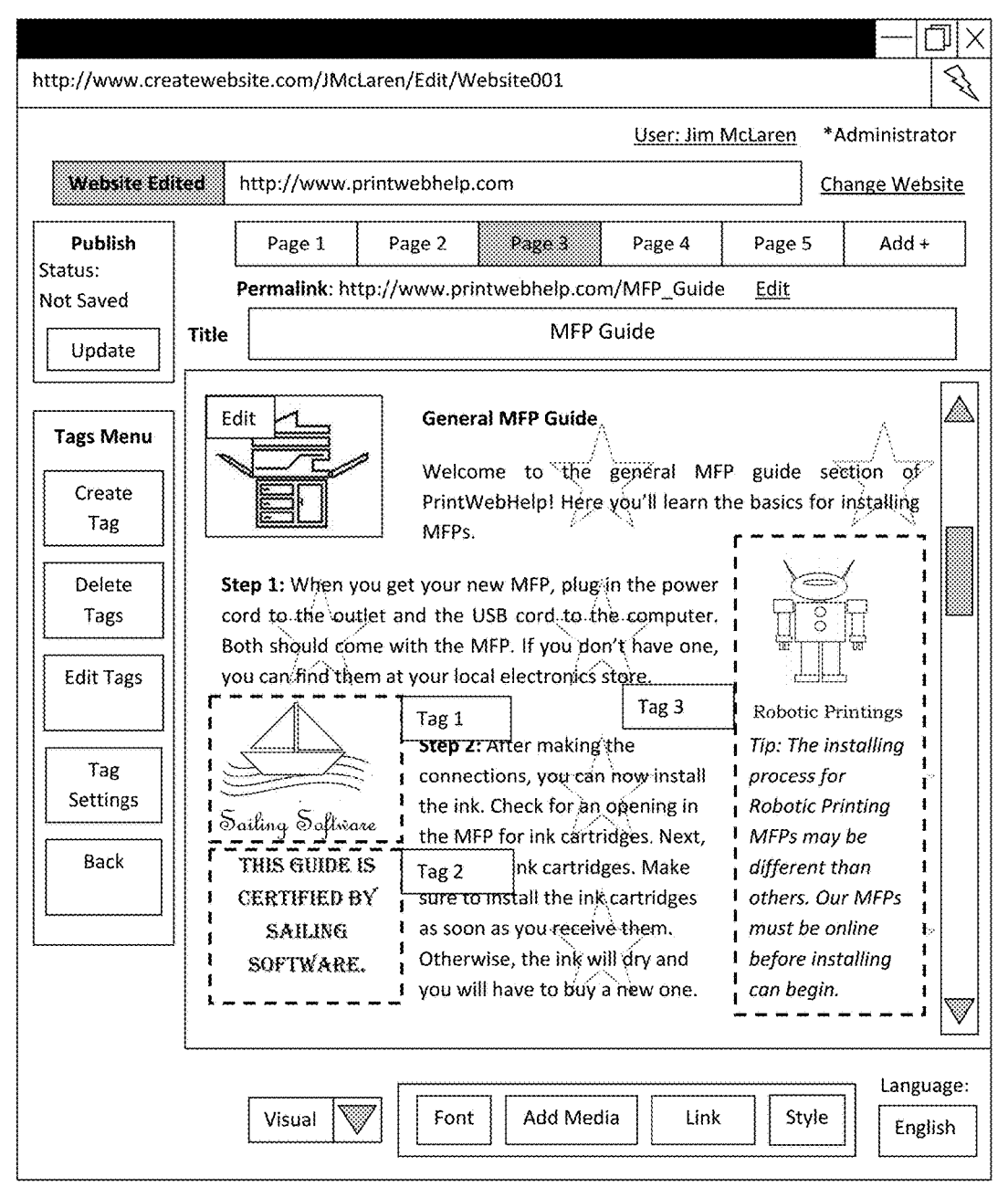

As shown in FIG. 7H, it is not necessary to tag the entire branding. For example, the branding for "Sailing Software" includes a logo (e.g., the sailboat image) and text (e.g., the statement certifying the guide). However, the user may select to create two tags, one for the logo and the other for the text which are shown as "Tag 1" and "Tag 2", respectively. One reason for this may be that the logo for "Sailing Software" may different for other countries. For example, "Sailing Software" may have registered a logo as an image of a sailboat in the U.S. but may have registered a Chinese Junk for Great Britain instead. Consequently, when users from Great Britain view the guide, they should see an image of Chinese Junk and not a sailboat.

After the user has finished associating at least one branding with a tag, the user may edit each tag by pressing the "Edit Tag" button the menu bar (S609). In one example, the user has decided to designate a "Show" tag to the "Robotic Printings" branding and performing editing of it, as shown in FIG. 7I. The "Show" tag is a tag that allows users to show that particular branding only to set of persons. For example, any persons who (1) are located in Great Britain or America, (2) are employees, (3) work for the company "Mecha Electronics", (4) use the operating system "Ricoh 2.0" or (5) show in their profile that they identify with MFPs or printers may be shown the "Robotic Printing" branding when they access the guide. In turn, any other users who do not identify with at least one those categories may not be able to view the "Robotic Printings" branding. One benefit is that by limiting some branding to certain users, more emphasis can be placed on brands with which the user is familiar, as opposed to ones with which the user is not familiar.

Figure 7J:
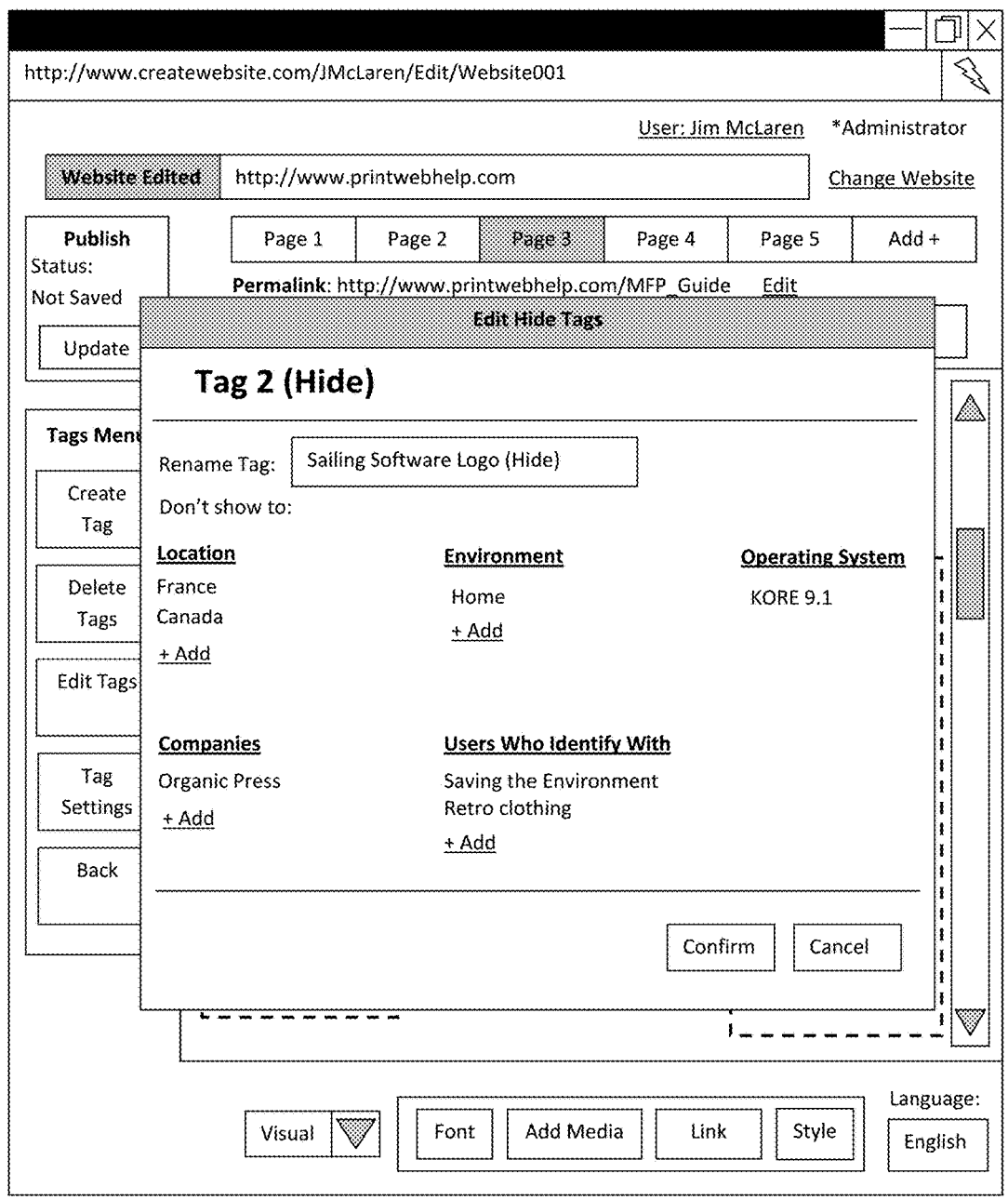

In addition, to a "Show" tag, the user is also able to create a "Hide" tag as well. The "Hide" tag hides or prevents a certain set of users from seeing the branding associated with that tag. Similar to the "Show" tag, the user may also perform editing of the "Hide" tag as shown in FIG. 7J to determine which users are able to view the branding. For example, in this case, any persons who (1) are located in France or Canada, (2) are using their computer from home, (3) work for the company "Organic Press", (4) use the operating system "KORE 9.0" or (5) show in their profile that they identify with saving the environment or like retro clothing, may not be shown the "Sailing Software" branding when they access the guide. Hiding certain brands from the users is beneficial in that some brands may not be pertinent to a user. Consequently, it would be a waste of space to place them there. Another reason is that there may certain groups of people who dislike certain brands. For example a group such as environmentalists may not like companies that pollute the water. As a result, it may not be a good idea to show brands from those companies to them.

Thus, the user is provided with a way to create branded help content by placing brands for product lines or companies onto a help page. Further the user can manipulate the help pages to show or hide brands to certain people.

Figure 7K:
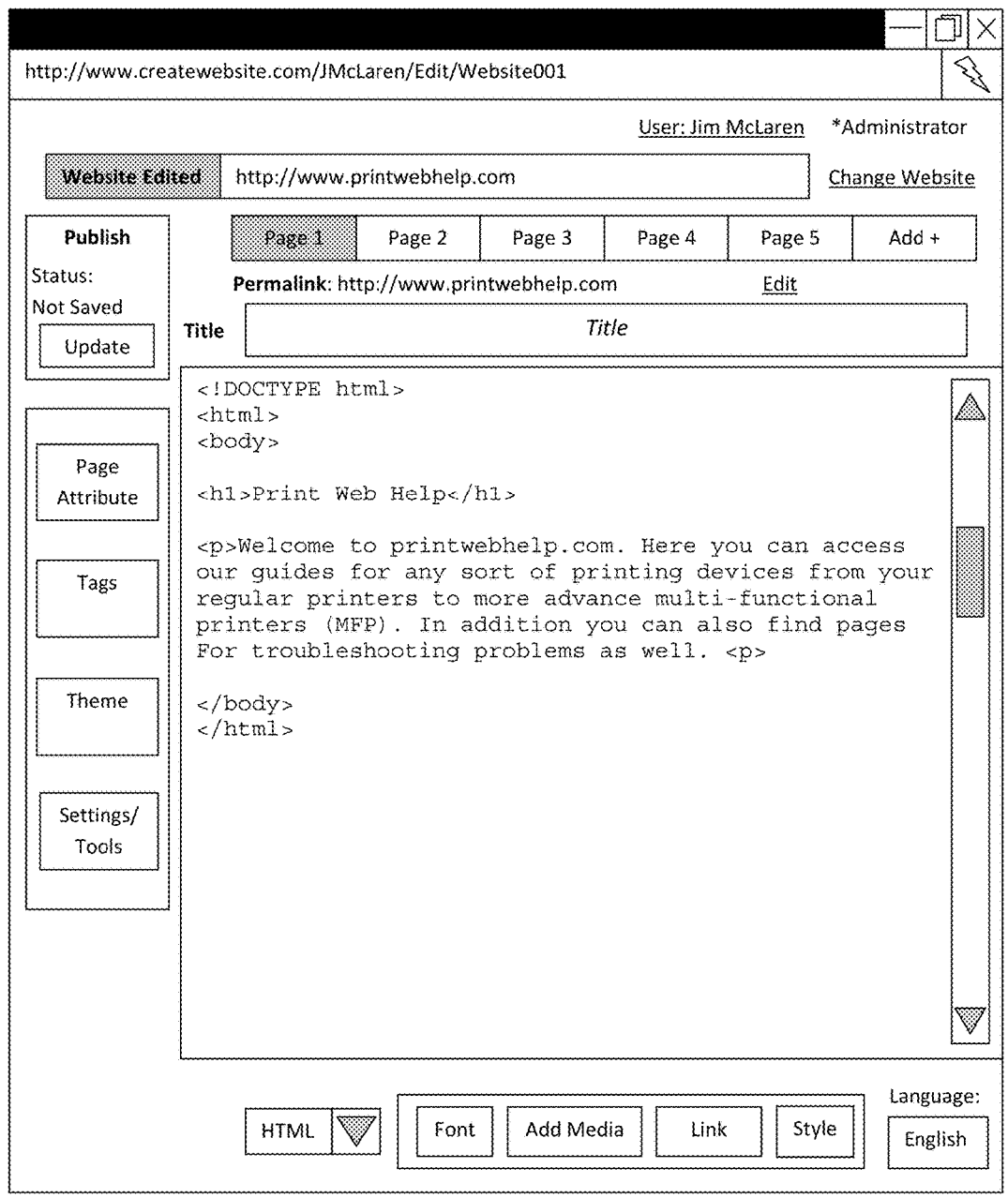

FIG. 7K is another example of how the first page may be created using HTML code. As shown, it is not necessary to create the webpage utilizing word processing tools or graphic user interface icons. The user may simply type in the syntax corresponding to HTML to create webpage similar to the ones shown previously.

Figure 7L:
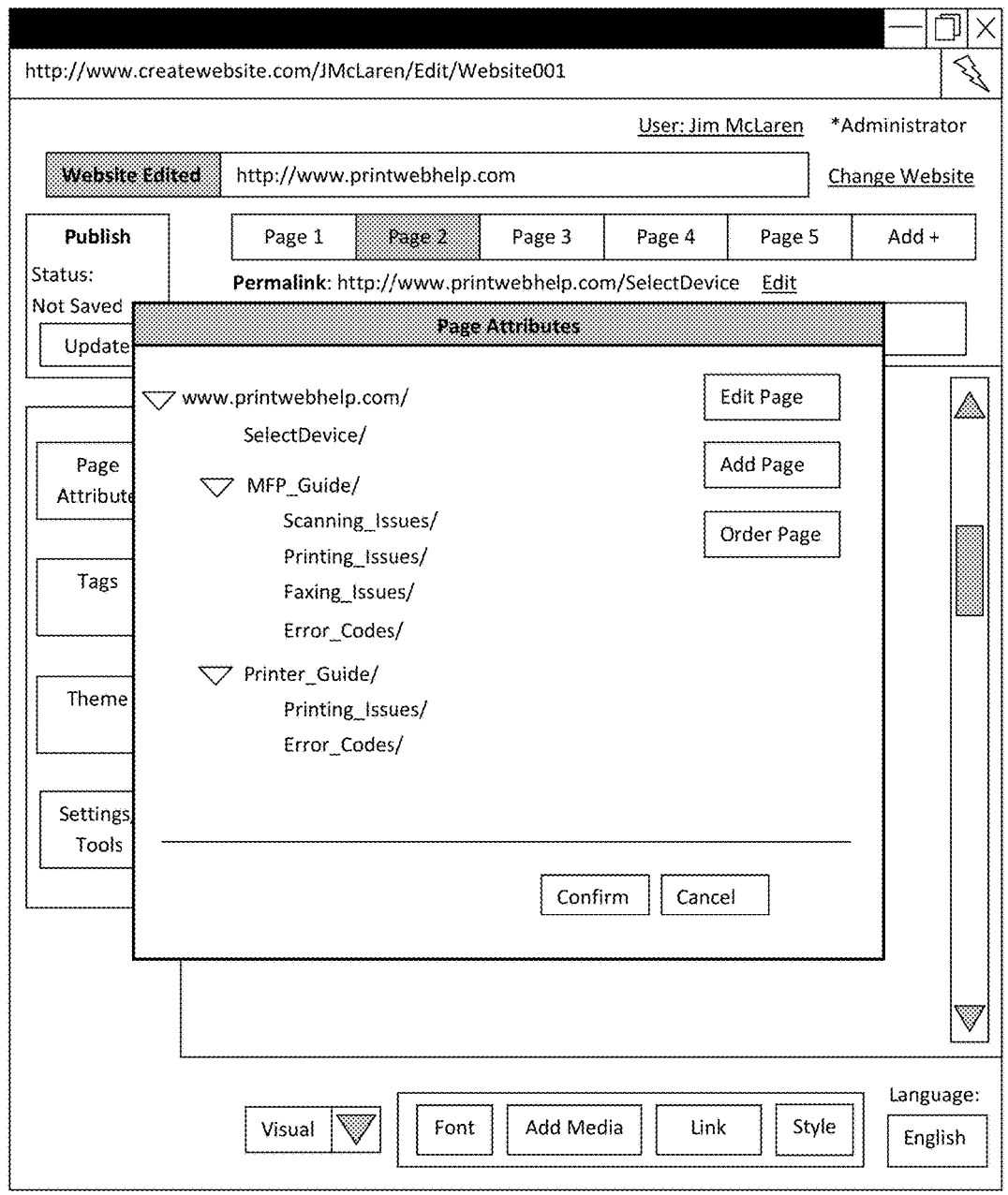

FIG. 7L is an example of the page hierarchy in the website. Each page except for the main page is identified by its root for simplicity. For example, the highest ranking page is the main page which in this case is "www.printwebhelp.com". However, the next highest ranking pages are "www.printwebhelp.com/SelectDevice", "www.printwebhelp.com/MFP_Guide" and "www.printwebhelp.com/PrinterGuide" which are represented by just their roots (e.g., SelectDevice, MFP_Guide, Printer_Guide). The user may add or edit a page using the "Edit Page" and "Add Page" buttons respectively. Further, the user may also rearrange the order of the pages as well. For example, the user may switch the web page "www.printwebhelp.com/Printer_Guide/Error_Codes" to a higher ranking equivalent to the "SelectDevice", "Printer_Guide" and "MFP_Guide" pages.

Figure 8:
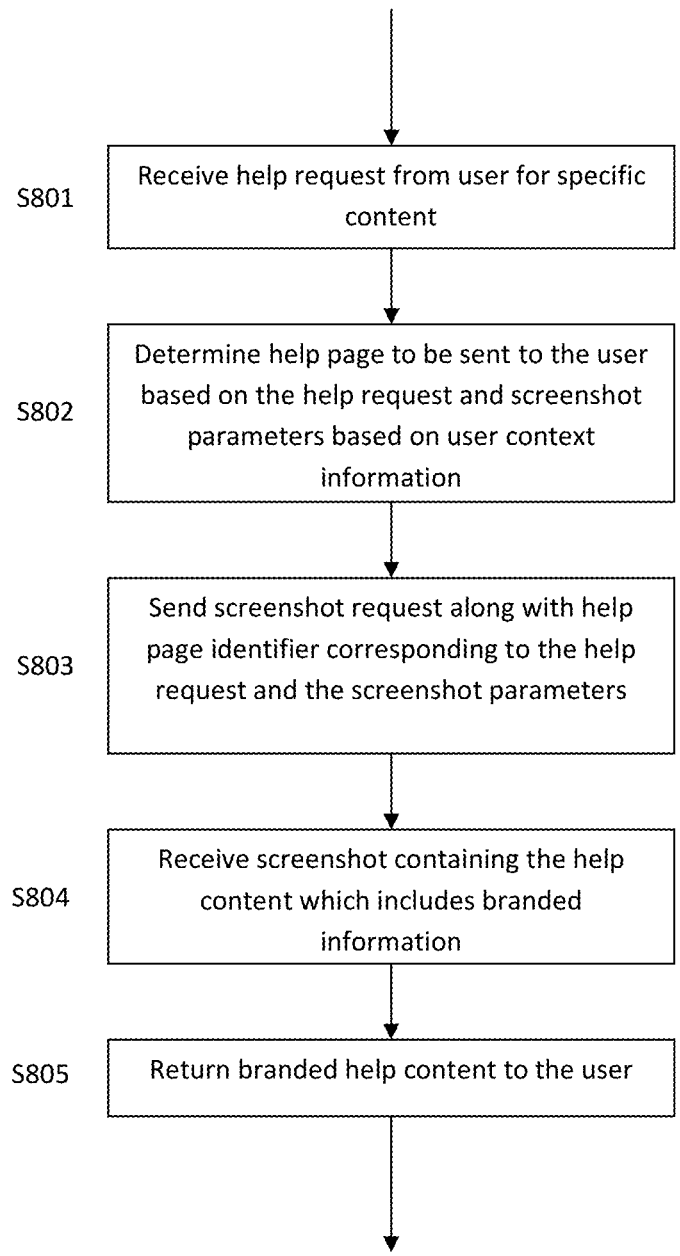
FIG. 8 shows a flow chart of a method for providing dynamic content, according to an exemplary embodiment.

FIG. 8 shows a process performed by a content providing apparatus (e.g., 101), for providing branded help content to a user, according to an exemplary embodiment.

Figure 9A:

A user may be currently using a program called "DocuMaker" which provides the user with the ability to create customized documents as shown in FIG. 9A. However, this may be the first time that the user is utilizing "DocuMaker". Consequently, he or she may not be familiar with its feature or functions. To solve this dilemma, the user may click the "help" link at the top of the page which brings the user to a screen as shown in FIG. 9B.

As shown the user is given many selections for different types of help content. For example, the user can access help with regards to using the basics of the program, accessing its advanced features or troubleshooting. In this case, since the user is not familiar with the program, he or she may select "Walkthrough" which itself is a link that brings up a webpage via a browser to display help content. After the user selects "Walkthrough", a help request which also includes context information is sent from the program to the content providing apparatus 101 (step S801). Next, the context providing apparatus 101 determines a help page that corresponds to the help request as well as screenshot parameters from the context information (step S802). Then, the context providing apparatus 101 sends the screenshot parameter and a help page identifier which identifies the help page (step S803) to a screenshot capture apparatus (e.g. 104). The screenshot capture apparatus 104 then determines a screenshot that contains branded help content which corresponds to the screenshot parameters and the help page identifier. Next, the screenshot capture apparatus 104 sends the screenshot which is received by the content providing apparatus 101 (step S804). Afterwards, the content providing apparatus 101 returns the branded help content to the user (step S805) which is shown in FIG. 9C.

Figure 9B:
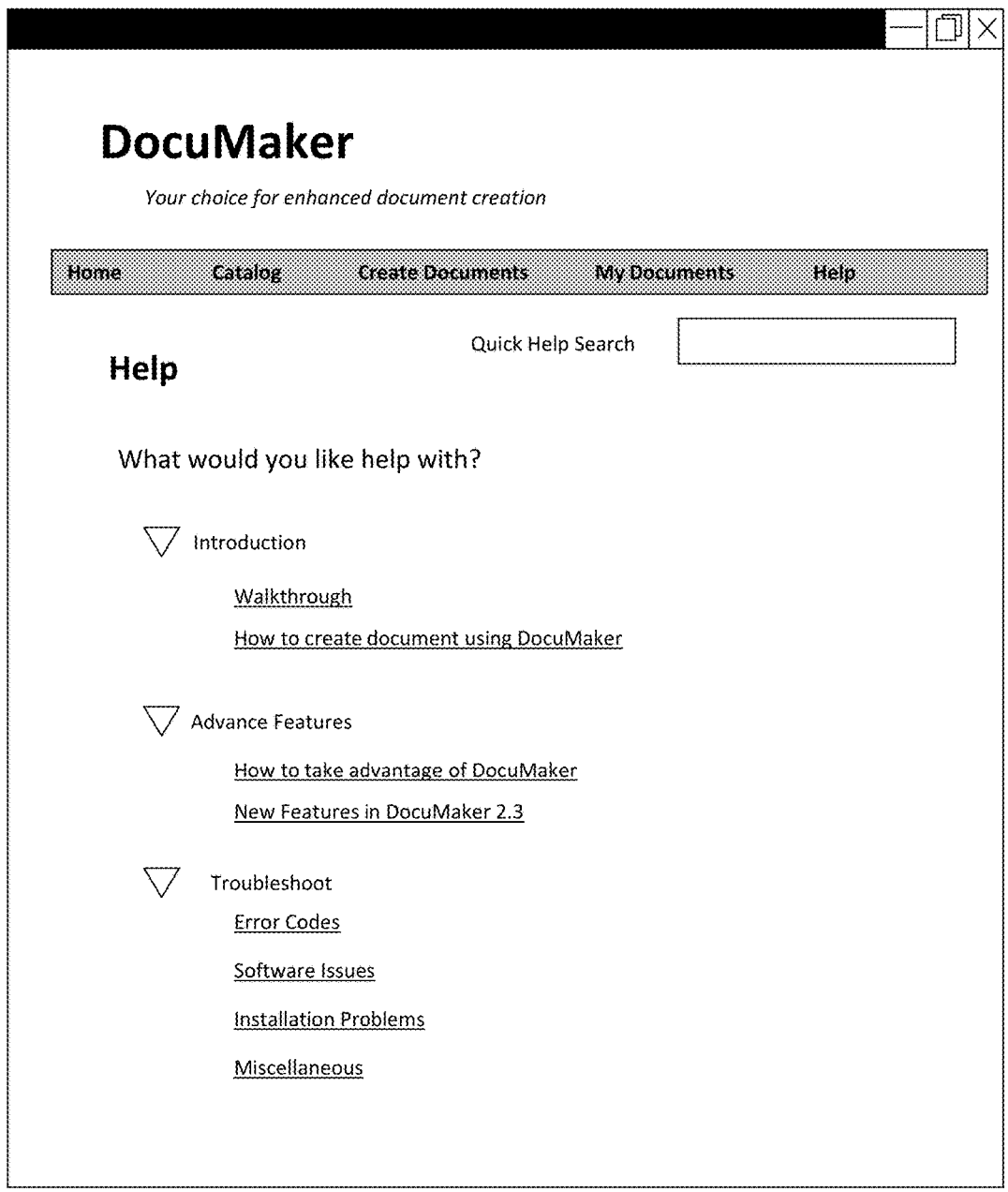
Figure 9C:
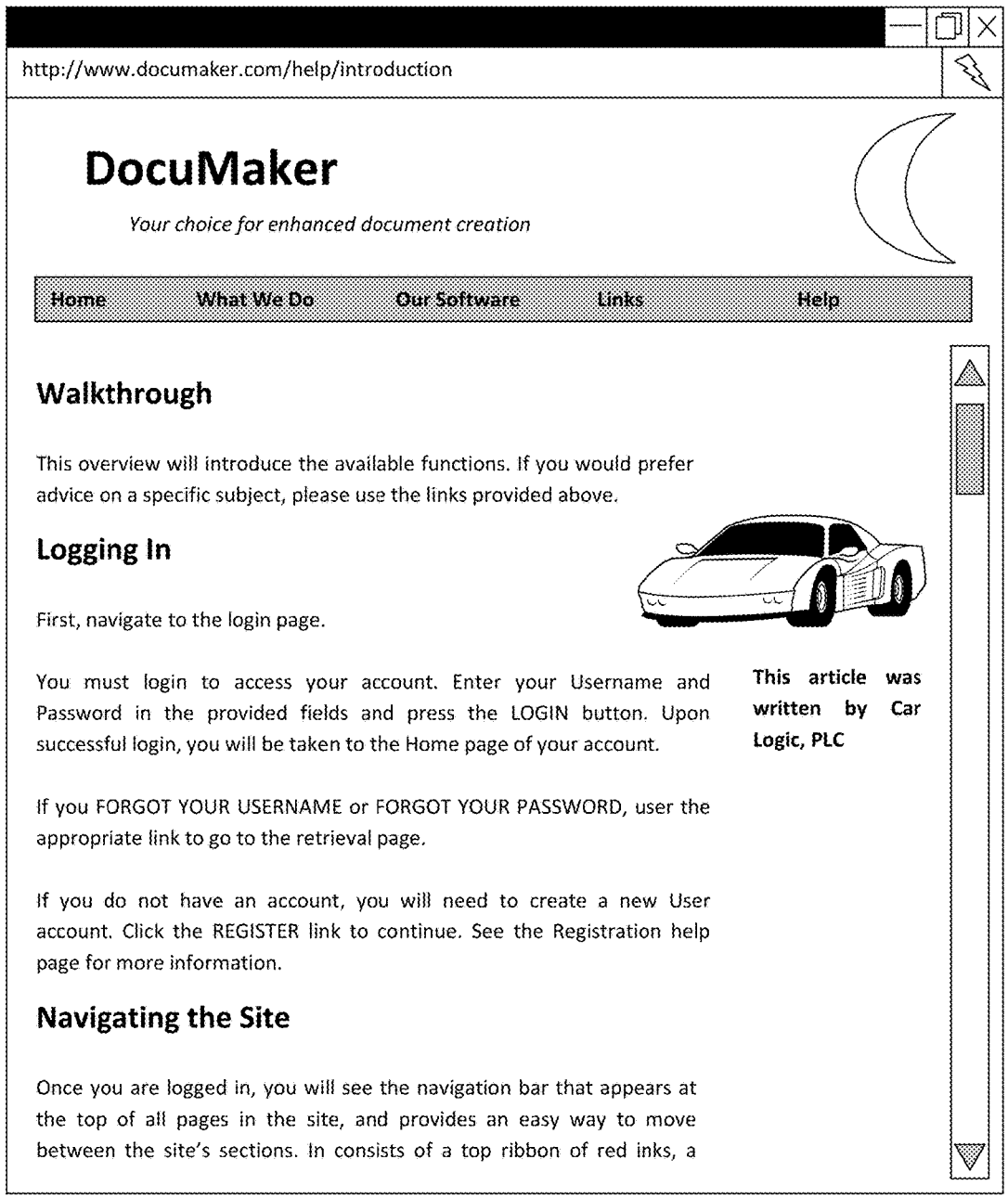

In FIG. 9C, the webpage containing branded help content received from the content providing apparatus 101 is displayed for a user who requested the "Walkthrough" selection in FIG. 9B. As shown, there is an image of a crescent moon which represents a logo of "DocuMaker". Further, there is one brand on the webpage logo which in this case is an image of a car along with text identifying that the walkthrough was written by a company named "Car Logic, plc" which is a company famous for writing walkthroughs and is located in Great Britain. It may be that the user is British and that is the reason why the brand for "Car Logic, plc" is on the webpage. However, a user from France may be shown another webpage that is different from a user from Great Britain.

When a user from France clicks the "Walkthrough" selection, the content providing apparatus 101 may determine that the help page should be in the French language and should include on the help page brands that are familiar to a French user. Further, the content providing apparatus 101 may also request the theme of the branded help page to be one that is different from the one shown to a British user. It may be the case that most French users prefer a certain theme.

The branded help page shown to a French user is illustrated in FIG. 9D. As state previously, the branded help page is in the French language. Further, the theme of the branded help page is significantly different from the one shown to a British user. For example, the colors are not the same. The titles in the French branded help page have grey highlights and the filling color for the menu bar is white while the outline is dashed. Further, most of the text is aligned to the right as opposed to the text in the British branded help page which is aligned to the left. The theme, however, is not the only difference. The logo for "DocuMaker", which is a crescent moon in the British branded help page, is the sun for the French branded help page. It may be possible that "DocuMaker" selected the sun for a logo in France since another company had already registered the crescent moon as a logo. In addition, the branding is different as well. In this case, the help content may have been written by a French company called "Imprimante Manchots". Consequently, the branding for "Imprimante Manchots" is on the branded help page instead of "Car Logic, plc". Thus, each user from different locations may not receive the same branded help page. Each branded help page may be customized based on the context information.

In an exemplary embodiment, the content that the user requests may not necessarily be help content. For example, a user may be currently using an application on his or her device that provides financial tips regarding saving money. One of the financial tips may show the user that building a high-end computer is inexpensive compared to purchasing one from a retail store. The application may include a link to such a webpage, illustrated in FIG. 9E, that contains an article regarding building such a computer. The webpage shown is a generic webpage stored in the screenshot apparatus. In this case, the branded content is not placed into the webpage until a user requests it. For example, after a user request for content is received, the content providing apparatus 101 can forward the request along with a page identifier corresponding to the requested content and screenshot parameters to the screenshot capture apparatus 104. In response, the screenshot capture apparatus 104 determines the branding to be placed on the page. After making the determination, the screenshot capture apparatus 104 reformats the page to accommodate the branding and sends it back via the content providing apparatus 101 for the user to view.

FIG. 9F shows the webpage after branded content has been placed in it. As discussed previously, the webpage has been reformatted to accommodate the branding. The text portion has been rearranged and the image of the computer which was originally in the content page has been moved to a lower position. In the resulting white space lay the brandings. In this case, the brandings are electronic stores or companies that had their employees contribute to writing the article. For example, there may be a total of seven companies that help write the content. However, only several of those companies and stores operate in the area that the user is in. For example, the user may be located in Memphis and only "Mark's Computer Shop", "Eddy Electronics" and "Best Computers, Inc" own stores there. As a result, they are the only brands that are shown on the page.

In another exemplary embodiment, a user may utilize a different method of creating a webpage for help content. First, the user logs onto an account for a website creating application as an administrative user. Then, the user may select a page that he or she wishes to edit from the website creating application's "All Pages" link or select "Add New" to add a new page of content. Both links are found on the left hand toolbar. Next, the user is directed to a page that can be used to edit the selected content.

In this page, the user may edit the title of the page through the "Title" textbox. Additionally, he or she may edit the page's contents by selecting from the tabs labeled "Visual" and "Text". The "Visual" tab displays a rendering of the content as it appears on the site. The "Text" tab displays the code used to create the content's format. Most content including text and images can be entered through the "Visual" tab. However, links to other pages may be written as HTML in the "Text" tab. Moreover, the content is divided to allow pages in different languages. To facilitate this, the user selects the tab that is relevant to the language that he or she is updating. For example, in the case that the user is updating an English version of the content, he or she may select "English" in addition to "Visual" or "Text". When the user is editing existing pages, he or she may press the "Update" button in the "Publish" menu to save changes. A new page can be published with the "Publish" button.

The user may check the hierarchy of the pages via the "Page Attributes" menu. If a parent is selected for a page, it will appear in a list under that page's name in the navigation bar. Without a parent, the page's name appears in the navigation bar. To order the pages in the navigation bar, or in a list under the parent page's name, a value is specified in the "Order" textbox.

To add images to the content, the user may select the "Add Media" button. Once an image has been added to the page, it may be selected to find the "Edit Images" pop-menu. The "Edit Image" button appears as a button in the top left hand corner of a selected image. In this pop-up menu, the user may specify the layout of the image. For example, the user may wish for text to appear next to the image. Additionally, the user may edit the image's source and link. Under the "Edit Image" pop-up menu the "Link URL" specifies the link that should be followed when a user clicks on an image. If the Link URL matches the "Source" URL, then clicking the image displays a full-size version of the image.

Screenshot images can be taken using the Screenshot-Driver. An individual screenshot can be taken by calling ScreenShotDriver.rb on the command line with parameters for the brand, target and locale. For example, a screenshot for a "login" page could be taken with the call 'ruby ScreenShotDriver.rb "ricoh" "login" "en". Alternatively, the parameters for brand and target may be set to "all" to take a batch of screenshots. To use dynamically branded screenshots, the user may format the image "Link URL" and "Source" in the form of "/screenshots/get.php?name-target-Name" with target name being the target of the screenshot given to the ScreenshotDriver. If this format is used, the user is displayed the appropriate branded screenshot.

The page may be tagged in the "Tags" menu. To facilitate this, the user adds the tag and presses the "Add" button. The tags can be used to select which content is displayed to the user. Each help page has a URL including "/help/page-name" with the page-name matching the name of the page. Further, the URL is updated to include the parameters "brand", "locale", "lang", "show" and "hide". The first parameter, "brand" allows brand specific content such as branded screenshots. "Locale" and "lang" allow the help content to be displayed in a language appropriate for the user. Tags are used to update the "show" parameter. If a tag is included in the parameter, the page associated with that tag is displayed. If the tag is not included, the page name does not appear in the navigation options. Therefore, content may be created so that users who did not find portions of the pages does not have access them either. Alternatively, part of the page's contents may be hidden using "hide" blocks. To facilitate this, the user may add "WebHelp canHide Begin (contentName)" with contentName being the parameter the user plans to use to identify the content. After the content, the user may add "WebHelp canHide END". These blocks allow the user to hide a small portion of the content rather than entire page.

Another way to ensure that the content is dynamic is to include parameters that may be displayed differently according to the user's information. These parameters are passed via the URL parameter &vars=key1:value1|key2:value 2. For example, a user can display a custom product name on the help page by including {PRODUCT_NAME} in the page content and then passing value through the URL like &vars=PRODUCT_NAME:Our Product.

The orders in which the steps are performed in the aforementioned methods are not limited to those shown in the examples of FIGS. 6 and 8, and may be switched as long as similar results are achieved. Further, the methods of FIGS. 6 and 8 may be implemented using any of the systems described in connection with FIGS. 1 and 2A.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A dynamic help content system including a screenshot capture apparatus, a content providing apparatus and an application providing apparatus, each of the screenshot capture apparatus, the content providing apparatus and the application providing apparatus including one or more processors and a non-transitory computer readable medium storing one or more programs of instructions executable by the processors, to cause the screenshot capture apparatus, the content providing apparatus and the application providing apparatus, in combination, to perform a process comprising the steps of:

(a) registering, by the screenshot capture apparatus, a plurality of screenshots, and registering, for at least one screenshot amongst the plurality of screenshots, as part of the registered screenshots, one or more show tags or hide tags associated with respective branded screenshot portions of the screenshot, each tag amongst the one or more show tags or hide tags including tag information indicating one or more tag conditions that are to be met before the tag is to be applied;

(b) providing, by the application providing apparatus, one or more application functions to application users, and in response to a help request from an application user, extracting context information, associated with the help request, and transmitting to the content providing apparatus a content request including the context information and requesting specified help content;

(c) generating, by the content providing apparatus based on the content request received from the application providing apparatus, a screenshot request including (i) an identifier of a specified help page corresponding to the specified content requested by the content request and (ii) a screenshot parameter corresponding to the context information, and transmitting the screenshot request to the screenshot capture apparatus;

(d) determining, by the screenshot capture apparatus in response to the screenshot request from the content providing apparatus, a requested screenshot, amongst the registered screenshots, and transmitting the requested screenshot to the content providing apparatus; and (e) compiling, by the content providing apparatus in response to receiving the screenshot from the screenshot capture apparatus, a help page to be returned in response to the content request from the application providing apparatus, including determining when the received screenshot includes said tags, based on comparison of the content request and the tag information of the tags, whether the branded screenshot portions associated with the respective tags are to be included in the help page to be returned, wherein a branded screenshot portion associated with a show tag is included in the help page to be returned, when the comparison of the content request and the tag information indicates that the tag conditions of the show tag are met, and a branded screenshot portion associated with a hide tag is excluded from the help page to be returned, when the comparison of the content request and the tag information indicates that the tag conditions of the hide tag are met; and (f) transmitting the help page to the application user in response to the help request.

2. The dynamic help content system of claim 1, wherein the process further comprises:

registering, by the application providing apparatus, for each user amongst plural users branding information corresponding to the user, wherein the branding information is included in the content request transmitted to the content providing apparatus, and the content providing apparatus causes said help page content to be branded based on the branding information.

3. The dynamic help content system of claim 2, wherein the branding information registered by the application providing apparatus for the application user is independent from the branding information registered by the application providing apparatus for other users amongst the plural users.

4. The dynamic help content system of claim 2, wherein the branding information registered by the application providing apparatus for the application user indicates a logo different from logos indicated by the branding information registered by the application providing apparatus for other users amongst the plural users.

5. The dynamic help content system of claim 2, wherein the branding information registered by the application providing apparatus for the application user indicates a theme different from themes indicated by the branding information registered by the application providing apparatus for other users amongst the plural users.

6. The dynamic help content system of claim 1, wherein the context information corresponds to an application page provided to the application user when the application user submitted the help request.

7. The dynamic help content system of claim 1, wherein the screenshot parameter included in the screenshot request transmitted by the content providing apparatus includes a brand, and the screenshot transmitted by the screenshot capture apparatus in response to the screenshot request includes graphics corresponding to the brand and combined with the help page content identified by the identifier.

8. The dynamic help content system of claim 1, wherein the screenshot parameter included in the screenshot request transmitted by the content providing apparatus includes a language or a locale, and the screenshot transmitted by the screenshot capture apparatus in response to the screenshot request includes text in the language or locale indicated in the screenshot parameter.

9. The dynamic help content system of claim 1, wherein the screenshot parameter included in the screenshot request transmitted by the content providing apparatus includes a specified tag, and the screenshot transmitted by the screenshot capture apparatus in response to the screenshot request includes a portion of the help page that is tagged by show tags matching the specified tag and does not include portions of the help page that are tagged by tags that do not match the specified tag.

10. The dynamic help content system of claim 1, wherein the screenshot parameter included in the screenshot request transmitted by the content providing apparatus includes a hide tag, and the screenshot transmitted by the screenshot capture apparatus in response to the screenshot request excludes a portion of the help page that is tagged by tags matching the hide tag.

11. The dynamic help content system according to claim 1, wherein the screenshot received by the content providing apparatus from the screenshot capture apparatus in response to the screenshot request includes a portion of the help page that is tagged by show-brand tags matching the specified tag in a case that the screenshot capture apparatus determines that the application user meets any of plural conditions associated with the show-brand tags and does not include portions of the help page that are tagged by the show-brand tags in a case that the application user satisfies none of the plural conditions associated with the show-brand tags without indicating to the application user that the portions of the help page that are tagged by the show-brand tags are omitted from the screenshot returned by the capture apparatus.

12. The dynamic help content system of claim 11, wherein the screenshot parameter included in the screenshot request transmitted by the content providing apparatus includes a brand, and the screenshot transmitted by the screenshot capture apparatus in response to the screenshot request includes graphics corresponding to the brand and combined with the help page content identified by the identifier.

13. The dynamic help content system of claim 11, wherein the screenshot parameter included in the screenshot request transmitted by the content providing apparatus includes a language or a locale, and the screenshot transmitted by the screenshot capture apparatus in response to the screenshot request includes text in the language or locale indicated in the screenshot parameter.

14. The dynamic help content system of claim 11, wherein the screenshot parameter included in the screenshot request transmitted by the content providing apparatus includes a hide tag, and the screenshot transmitted by the screenshot capture apparatus in response to the screenshot request excludes a portion of the help page that is tagged by tags matching the hide tag.

15. The dynamic help content system of claim 1, wherein a presented image included in the help page transmitted by the content providing apparatus to the application user differs from another image included in a help page transmitted by the content providing apparatus to another application user without the text included in the branded content returned to the application user being in a different language than the text returned to said another application user, and wherein said presented image and said another image correspond to respective locations of the application user and said another application user, and the text included in the branded content returned to the application user is in a language corresponding to that of the text returned to said another application user.

16. A method for providing dynamic help content in a dynamic help content system including a screenshot capture apparatus, a content providing apparatus and an application providing apparatus, each of the screenshot capture apparatus, the content providing apparatus and the application providing apparatus including one or more processors and a non-transitory computer readable medium storing one or more programs of instructions executable by the processors, to cause the screenshot capture apparatus, the content providing apparatus and the application providing apparatus, in combination, to perform the method, said method comprising the steps of:

(a) registering, by the screenshot capture apparatus, a plurality of screenshots, and registering, for at least one screenshot amongst the plurality of screenshots, as part of the registered screenshots, one or more show tags or hide tags associated with respective branded screenshot portions of the screenshot, each tag amongst the one or more show tags or hide tags including tag information indicating one or more tag conditions that are to be met before the tag is to be applied;

(b) providing, by the application providing apparatus, one or more application functions to application users, and in response to a help request from an application user, extracting context information, associated with the help request, and transmitting to the content providing apparatus a content request including the context information and requesting specified help content;

(c) generating, by the content providing apparatus based on the content request received from the application providing apparatus, a screenshot request including (i) an identifier of a specified help page corresponding to the specified content requested by the content request and (ii) a screenshot parameter corresponding to the context information, and transmitting the screenshot request to the screenshot capture apparatus;

(d) determining, by the screenshot capture apparatus in response to the screenshot request from the content providing apparatus, a requested screenshot, amongst the registered screenshots, and transmitting the requested screenshot to the content providing apparatus; and (e) compiling, by the content providing apparatus in response to receiving the screenshot from the screenshot capture apparatus, a help page to be returned in response to the content request from the application providing apparatus, including determining when the received screenshot includes said tags, based on comparison of the content request and the tag information of the tags, whether the branded screenshot portions associated with the respective tags are to be included in the help page to be returned, wherein a branded screenshot portion associated with a show tag is included in the help page to be returned, when the comparison of the content request and the tag information indicates that the tag conditions of the show tag are met, and a branded screenshot portion associated with a hide tag is excluded from the help page to be returned, when the comparison of the content request and the tag information indicates that the tag conditions of the hide tag are met; and (f) transmitting the help page to the application user in response to the help request.

17. The method of claim 16, further comprising:
determining a brand corresponding to the screenshot parameter included in the screenshot request; and
assembling the requested screenshot by combining graphics corresponding to the brand with the help page content identified by the identifier included in the screenshot request.

18. The method of claim 16, further comprising:
determining a language or a locale corresponding to the screenshot parameter included in the screenshot request received by the screenshot capture apparatus; and
assembling the requested screenshot to include text corresponding to the language or locale indicated in the screenshot parameter.

19. The method of claim 16, wherein
the screenshot received by the content providing apparatus from the screenshot capture apparatus in response to the screenshot request includes at least a portion of the help page that is tagged by show-brand tags matching a specified tag in the screenshot request in a case that the screenshot capture apparatus determines that the application user meets any one or more of plural conditions associated with the show-brand tags, and
the returned screenshot does not include portions of the help page that are tagged by the show-brand tags in a case that the application user satisfies none of the plural conditions associated with the show-brand tags without indicating to the application user that the portions of the help page that are tagged by the show-brand tags are omitted from the screenshot returned by the capture apparatus.

* * * * *